(12) United States Patent
Tomiyama et al.

(10) Patent No.: US 6,611,632 B1
(45) Date of Patent: Aug. 26, 2003

(54) DEVICE AND METHOD FOR INTERPOLATING IMAGE DATA AND MEDIUM ON WHICH IMAGE DATA INTERPOLATING PROGRAM IS RECORDED

(75) Inventors: Tadao Tomiyama, Nagano-ken (JP); Masahiro Someno, Nagano-ken (JP); Michinao Osawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/445,475

(22) PCT Filed: Apr. 8, 1999

(86) PCT No.: PCT/JP99/01853

§ 371 (c)(1),
(2), (4) Date: May 9, 2000

(87) PCT Pub. No.: WO99/53441

PCT Pub. Date: Oct. 21, 1999

(30) Foreign Application Priority Data

Apr. 10, 1998 (JP) .............................. 10-099006
Apr. 10, 1998 (JP) .............................. 10-099007

(51) Int. Cl.$^7$ ................................................. G06K 9/32
(52) U.S. Cl. ....................................................... 382/300
(58) Field of Search ............................ 382/162, 167, 382/173, 180, 300

(56) References Cited

U.S. PATENT DOCUMENTS 5,937,085 A * 8/1999 Ishida ...................... 382/162

FOREIGN PATENT DOCUMENTS

| JP | 60-218180 | 10/1985 | |
| JP | 62-200976 | 9/1987 | |
| JP | 2-9268 | 1/1990 | |
| JP | 4-77788 | 3/1992 | G09G/5/26 |
| JP | 4-340671 | 11/1992 | G06F/15/66 |
| JP | 5-94521 | 4/1993 | G06F/15/66 |
| JP | 5-252385 | 9/1993 | H04N/1/40 |
| JP | 6-225140 | 8/1994 | H04N/1/40 |
| JP | 7-107272 | 4/1995 | H04N/1/393 |
| JP | 7-182502 | 7/1995 | G06T/3/40 |

OTHER PUBLICATIONS

International Search Report.

* cited by examiner

*Primary Examiner*—Phuoc Tran
(74) *Attorney, Agent, or Firm*—Sughrue Mion, PLLC

(57) ABSTRACT

When a plurality of types of image data are superposed and written onto a color information virtual drawing screen, attribute information of each pixel is written onto an attribute information virtual drawing screen so that the image data can be read out for every type. When results of superposition are read out from a virtual drawing screen for an interpolating process, the results are read out for every type of image data on the basis of the attribute information so that an optimum interpolating process suitable for each type is carried out. Since a margin of each image data is affected by the interpolating process, superposition after the interpolating process is controlled so that the margin is rendered most suitable. As a result, optimum results of interpolation can be achieved even when a plurality of types of image data are co-existent.

24 Claims, 34 Drawing Sheets

◯ EXISTENT PIXEL

○ EXISTENT PIXEL

□ INTERPOLATED PIXEL

Fig. 18A
PRESENT RANGE
NEXT RANGE
Fig. 18B
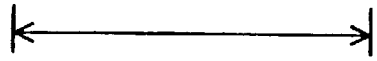
Fig. 18C ← 4-BIT SHIFT
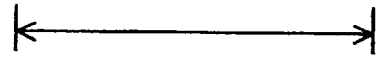

Fig. 21A — NATURAL IMAGE COLOR INFORMATION
Fig. 21B — CHARACTER COLOR INFORMATION

NATURAL IMAGE
COLOR INFORMATION
INTERPOLATING PROCESS
BUFFER

CHARACTER
COLOR INFORMATION
INTERPOLATING PROCESS
BUFFER

CO-EXISTENT

=

NATURAL IMAGE

+

NON-NATURAL IMAGE

Fig. 24A
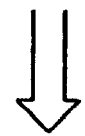
MARGINAL EXTENSION
Fig. 24B
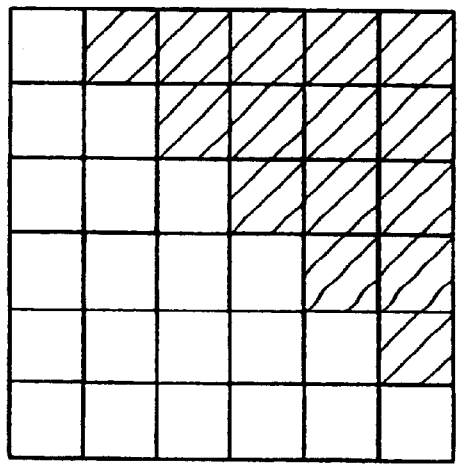
Fig. 24C
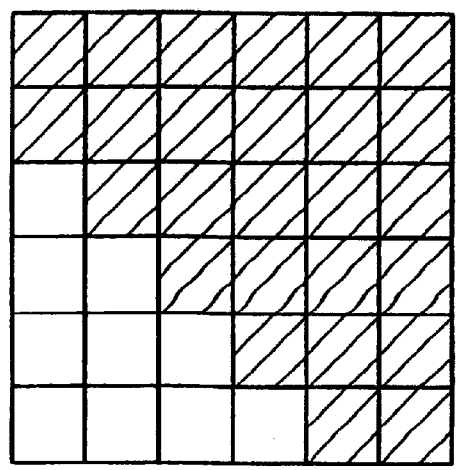
Fig. 24D

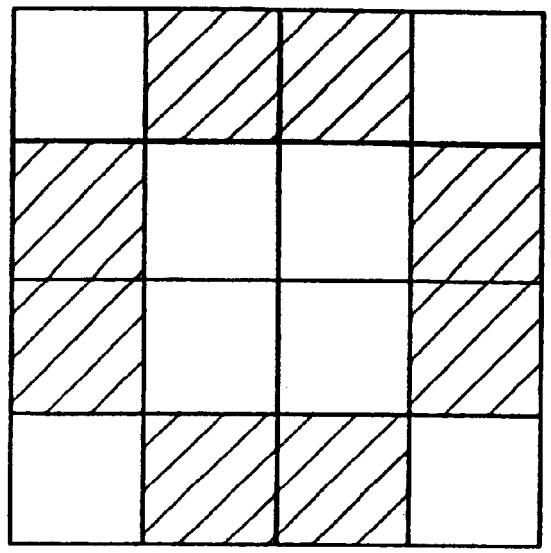
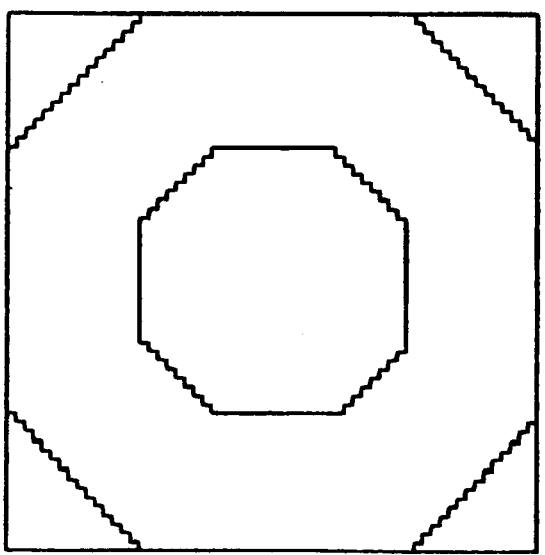
Fig. 25

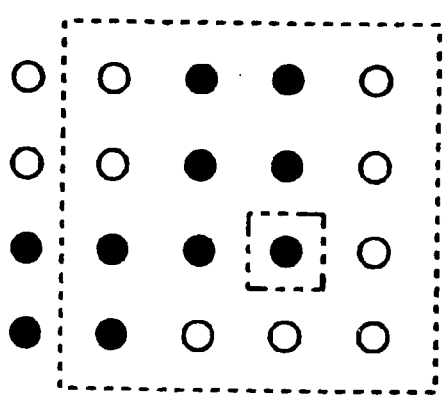
Fig. 29A
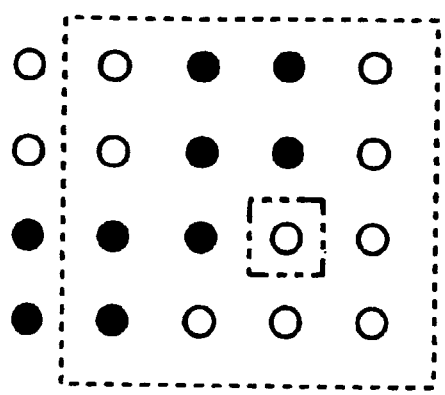
Fig. 29B
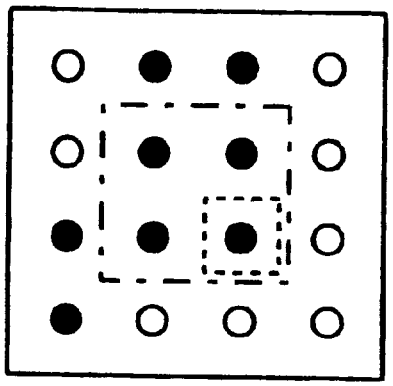
Fig. 29C
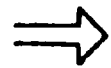
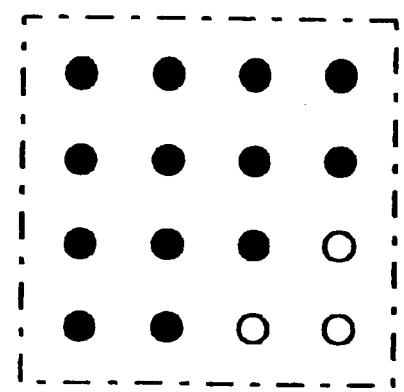
Fig. 29D

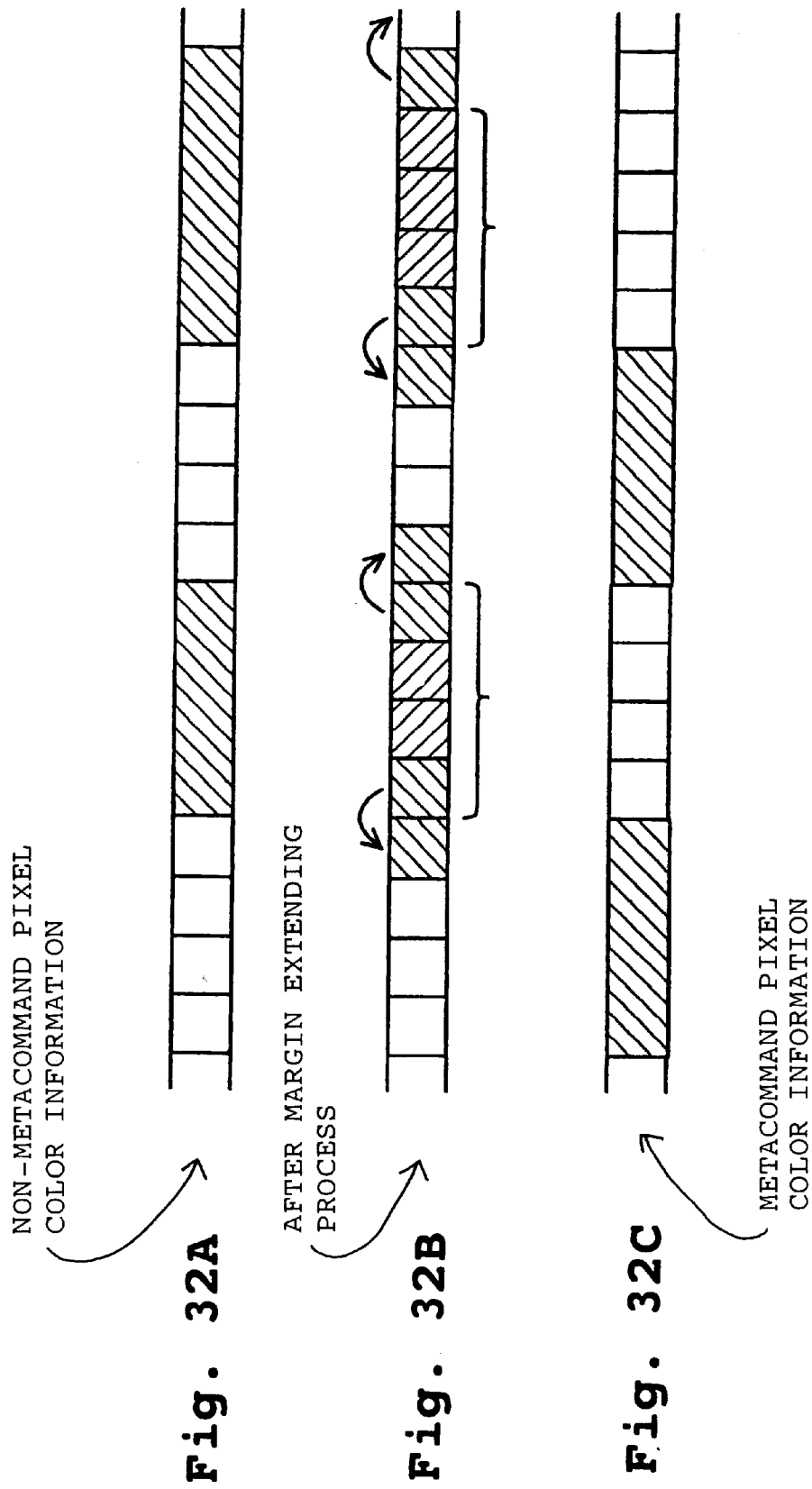

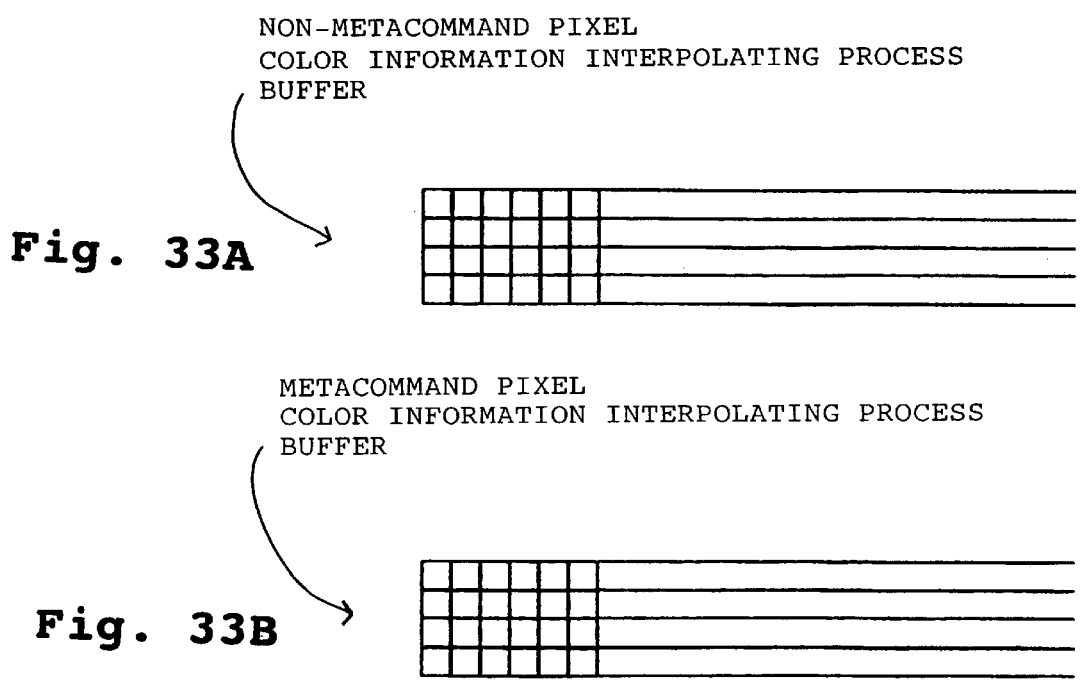
Fig. 33A  NON-METACOMMAND PIXEL COLOR INFORMATION INTERPOLATING PROCESS BUFFER
Fig. 33B  METACOMMAND PIXEL COLOR INFORMATION INTERPOLATING PROCESS BUFFER

Fig. 34A
Fig. 34B
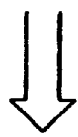
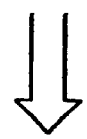
MARGINAL EXTENSION
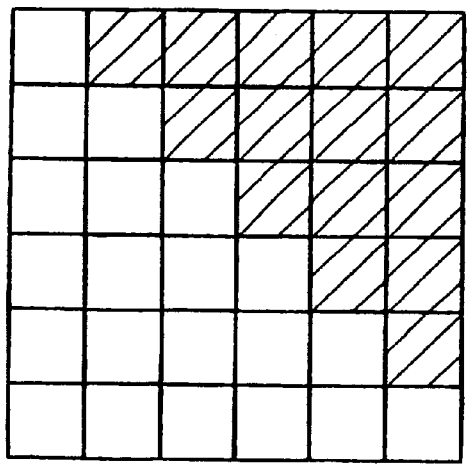
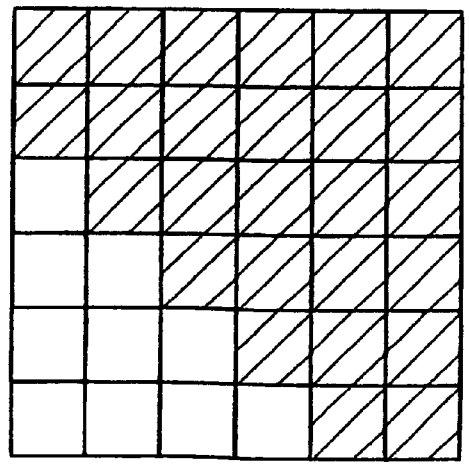
Fig. 34C
Fig. 34D

DEVICE AND METHOD FOR INTERPOLATING IMAGE DATA AND MEDIUM ON WHICH IMAGE DATA INTERPOLATING PROGRAM IS RECORDED

BACKGROUND OF THE INVENTION

1. Field of the Invention

The present invention relates a device and a method for interpolating image data comprising a dot-matrix image and a medium on which a program for interpolating the image data is recorded.

2. Description of the Prior Art

An image is represented as dot-matrix pixels when treated in a computer etc., and each pixel is represented by a graduation value. For example, a photograph and computer graphics are sometimes displayed on a screen of the computer by 640-dot pixels in the horizontal direction and 480-dot pixels in the vertical direction.

On the other hand, color printers have recently been improved in their performances rapidly and now have a high accurate dot density, for example, 720 dpi. When an original image composed of 640×480 dots is printed so that a printed image corresponds to the original one in the dots, the printed image becomes smaller than the original one. In this case, images to be printed have various gradation values, and the color printers have different resolutions. Accordingly, the original image data is required to be interpolated between dots before converted to printing image data.

The prior art has provided, as techniques for interpolating the dots, a nearest neighbor interpolation method (hereinafter, "nearest method") and a cubic convolution interpolation method (hereinafter, "cubic method"). Further, Japanese patent publication No. 6-225140A discloses a technique for providing dot patterns so that an edge takes such an enlarged form as to be smoothed when edge smoothing is performed after dots have been interpolated.

The aforesaid interpolation techniques have the following problems. The nearest and cubic methods have their respective advantages and disadvantages. On the other hand, there have recently been many cases where a single document to be printed contains a plurality of types of objects to be processed. Accordingly, when an interpolating process is carried out for an object to be processed, the quality of result of interpolation is reduced with respect to a processing mode for which the interpolating process is ill fitted.

Meanwhile, in the invention disclosed in Japanese patent publication No. 6-225140A, the number of patterns becomes enormously large when a color image is premised on, so that it is difficult to previously prepare the patterns.

Further, noise pixels are sometimes produced due to an error in the operation when the pixels are generated at a low resolution regarding metacommmand pixels. Such noise pixels are also enlarged by the interpolating process.

SUMMARY OF THE INVENTION

The present has been made in view of the foregoing problem and an object of the invention is to provide a device and method for interpolating image data in which a satisfactory result can be achieved when a plurality of types of objects to be processed is contained, and a medium on which a program for interpolating the image data is recorded.

To accomplish the object, the invention of claim 1 provides an image data interpolating apparatus which obtains image data containing attribute information capable of distinguishing a type of image for every pixel and enlarges the image data by an interpolating process, the device comprising a readout unit which reads out the image data, an interpolating unit which distinguishes a plurality of image types of the pixels based on the attribute information and applies one of a plurality of interpolating processes differing for every one of the image types to each one of the pixels, and a synthesizing unit which synthesizes the pixels interpolated by the different interpolating processes.

In the invention of claim 1 constructed as described above, the image data is obtained and enlarged by the interpolating process. The image data contains attribute information capable of recognizing a type of image for every pixel. When the readout unit reads out the image data, the interpolating unit distinguishes image types of the pixels based on the attribute information and applies one of a plurality of interpolating processes differing for every one of the image types to each one of the pixels, and the synthesizing unit synthesizes the pixels interpolated by the different interpolating processes.

More specifically, the images include several types, and a most suitable pixel interpolating process differs according to the types. Accordingly, the image data containing the several types of images is recognized for every type of image and interpolated. The interpolating process and the synthesizing process need not be carried out separately but may be united together.

The image data is an ordinary one representing a pattern constituted by dot-matrix pixels and should not be limited particularly to a picture as a figure, photograph or characters. Further, the image data itself may be a set of dots but need not represent the respective dots. For example, the image data may be composed of drawing commands for drawing an image or fonts comprising vector information.

The image data contains several attributes differentiating properties of images and is held so as to be read out with the attributes being recognized. The image data may previously be prepared or may newly be written onto a virtual region on the basis of the image data. As an example suitable for this case, the image data interpolating apparatus of claim 2 is constructed so that in the image data interpolating apparatus of claim 1, a virtual drawing unit is provided which inputs the plurality of types of image data having different image types to superpose the image data in a predetermined order and renders the image types distinguishable, thereby performing a drawing operation in a virtual region, wherein the readout unit reads out the image data from the virtual region.

That is, the virtual drawing unit superposes the image data in the predetermined order, rendering the types in the image data distinguishable, to thereby perform the drawing operation.

The types in the image data are recognizable for every pixel. Various techniques to render the types recognizable can be employed. For example, an attribute area may separately be provided so that types of individual data are written as attributes onto the virtual region. Consequently, the type of each pixel can be found when the attribute area is referred to. In this case, writing may be performed by the virtual drawing unit.

The virtual region may be prepared for every type of image data and have a layer structure with a text screen and a natural screen. The enlarging process may be carried out while the image data is being input from the layer structure by an application. Furthermore, a part of the image data recognizable of the attribute of the image data may be read out for every type, and the remaining part of the image data may be undistinguishable.

The readout unit reads out the image data of every pixel for every type. For example, when the type can be determined from the attribute area, the readout unit selects the image data to be read out while referring to the attribute area.

Further, since a two-dimensional processing is performed in the interpolating process, the image data needs to be input accordingly. For this purpose, when the image data is read out from the virtual region, a plurality of lines of the image data may be input for the interpolating process. As a result, a two-dimensional interpolating process can be realized.

Various types of interpolating process may be employed. For example, the interpolating process by the cubic method is suitable for a natural image though unsuitable for a business graph. On the other hand, the nearest method is suitable for a non-natural image such as the business graph though unsuitable for the natural image. Whether the image data is a natural image or a non-natural image is a kind of characteristic of the image. The interpolating process is selected according to such a characteristic. Further, the interpolating process for the natural image can sometimes be changed depending upon an object. For example, the interpolating process may be changed between a daylight photograph and a night photograph. More specifically, the characteristic of the image may only affect the result of interpolation when the interpolating process is changed.

As another example, the interpolating unit may be provided with pattern data corresponding to presence or absence of pixel information in a predetermined area and interpolation pixel information with a predetermined interpolating scale factor corresponding to each pattern data. The interpolating unit may input a pixel of the corresponding area from the virtual region and compare the pixel with the pattern data, so that the interpolating process is performed on the basis of the interpolation pixel information corresponding to the matched pattern data.

In the case of the above-described construction, the interpolating process is carried out by the pattern matching with respect to a predetermined small area. More specifically, the pattern data corresponding to presence or absence of the pixel information corresponding to the small area is prepared, and a pixel in the corresponding area is read out from the virtual region and compared with the pattern data. The interpolating process is performed on the basis of the interpolation pixel information of a predetermined interpolating scale factor corresponding to the pattern data which matches the pattern data. Accordingly, an expected noise pixel can be prepared as the pattern data and the interpolation pixel information in which the noise pixel is deleted according to the pattern data.

In the aforesaid pattern matching, renewing all the comparison data is troublesome when an object area is moved so that a new pattern matching is performed. In this case, the pattern data may be a rectangular area containing pixels whose number corresponds to a concurrently processible data width, and a new sequence of pixels is incorporated into the comparison data in a moving direction of the rectangular area by a first-in first-out process so that the matching with the pattern data is continued.

In the above-described arrangement, the pattern matching can be carried out by one operational processing per area in the case of a rectangular area containing pixels whose number corresponds to a concurrently processible data width. Further, when the object area is moved so that a new pattern matching is carried out, not all the comparison data need be renewed, and a new sequence of pixels is incorporated into the comparison data in a moving direction by the first-in first-out process. More specifically, the comparison with pattern data of 16 pixels is performed in the pattern matching of pixels whose number is 4×4. When a square area is moved by one pixel, information about three rows of pixels does not substantially change. Information about presence or absence of one row of four pixels at the forward side relative to the moving direction is incorporated into the comparison data, and information about presence or absence of one row of four pixels at the backward side is out of target. Accordingly, the first-in first-out is carried out with respect to the four pixels, so that not all the comparison data need be renewed. Consequently, the pattern matching can be carried out easily and efficiently.

The determination cannot be made on the basis of only the presence or absence of pixels when the pattern matching is applied to a color image. Accordingly, pattern data needs to be prepared for every color, but this is unrealistic. On the other hand, the interpolated image data corresponding to the pattern data may be arranged to include color arrangement information of every color in the comparison data.

In the above-described arrangement, the pixels are matched with the comparison data representative of the presence or absence of pixels. Since the interpolated image information referred to when the pixels have been matched with the comparison data includes the color arrangement information, the interpolation, of the color image by the pattern matching is substantially accomplished by the color arrangement. Consequently, the color image can also be interpolated by the pattern matching.

The synthesizing unit synthesizes image data for which the pixels thereof have been interpolated. In this case, when interpolating unit is arranged to temporally hold the results of interpolating process for every image data in another region, the image data held in the region is superposed in a predetermined sequence. Alternatively, the results of interpolation may be written onto a predetermined output region with the interpolating process being carried out in the predetermined sequence.

Although the synthesizing unit thus synthesizes the image data in the predetermined sequence, the superposition can be performed more satisfactorily according to the character of the interpolating process. As an example, the invention claimed in claim 3 is constructed so that in the image interpolating apparatus of claim 1 or 2, the synthesizing unit includes a margin processing unit which adjusts superposition of margins of the image data after interpolation of the pixels.

In the invention of claim 3 thus constructed, the margin processing unit of the synthesizing unit adjusts the superposition of margins of the image data after the image interpolation.

Since the interpolating process generates new pixels and there are different techniques in the interpolating process, a configuration of the margin varies when different interpolating processes are applied. For example, when there are an interpolating process resulting in a large variation in the marginal configuration and another interpolating process maintaining an original marginal configuration, the superposition is preferably carried out on the basis of the marginal configuration in the latter. In this sense, the margin processing unit adjusts the superposition.

The adjustment by the margin processing unit may be changed according to the interpolating process. As an example, the margin processing unit may superpose a plurality of types of image data for which the pixels thereof have been interpolated, in a sequence predetermined according to the interpolating process.

In the above-described arrangement, the margin is adjusted by superposing the image data in the sequence predetermined according to the interpolating process. In the aforesaid example, there are an interpolating process resulting in a large variation in the marginal configuration and another interpolating process maintaining an original marginal configuration. In this case, the former is first written onto a predetermined output region and thereafter, the latter is overwritten such that the marginal configuration of the latter is used.

As another example, the margin processing unit may first write onto the output region the image data corresponding to an interpolating process in which the margin is expanded.

In the above-described arrangement, when there is image data in which the margin is expanded as the result of the interpolating process, the margin processing unit first writes that image data to be interpolated by the interpolating process onto the output region. The margin is narrowed or expanded depending upon the interpolating process. The margin intrudes into an adjacent region when expanded. Accordingly, the image data is first written onto the output region and the marginal portion is overwritten so that a percentage of the portion intruding into the adjacent region is substantially reduced, whereupon the marginal configuration is maintained.

Furthermore, the margin processing unit may write the image data for which an interpolating process in which the marginal configuration is smoothed is carried out, later than the image data for which another interpolating process is carried out.

When there are the interpolating process in which the marginal configuration is smoothed and another interpolating process, the interpolating process in which the marginal configuration is smoothed can maintain the marginal configuration. Accordingly, when the image data corresponding to the interpolating process in which the marginal configuration is smoothed is first written onto the output region, the marginal configuration which should not be maintained is maintained, which is inconvenient. Accordingly, the image data corresponding to the interpolating process in which the marginal configuration is smoothed is later written onto the output region.

Whether the marginal configuration is maintained depends upon a purpose. For example, the margin is easily smoothed in the pattern matching. There is a case where the marginal configuration is maintained when such smoothing is carried out. On the other hand, although shagginess becomes more conspicuous as an interpolating scale factor is increased, as in the nearest method, the marginal configuration can be maintained.

Furthermore, the invention claimed in claim 4 is constructed so that in the image data interpolating apparatus of claim 3, when the readout unit reads out the image data, the margin processing unit causes the readout unit to read out the image data with a margin enlarged, thereby superposing the image data on the image data interpolated by the interpolating unit on the basis of the image data with the enlarged margin.

In the invention of claim 4 thus constructed, when the readout unit reads out the image data, the margin processing unit causes the readout unit to read out the image data with a margin enlarged. The image data is then superposed on the image data interpolated by the interpolating unit on the basis of the image data with the enlarged margin.

The resultant interpolation image data is expanded when the original image data is previously expanded. Then, even when the margin of the resultant interpolation image data adjacent to the expanded image data does not match that of the expanded image data, that margin is reserved as a foundation and the missing of pixels is prevented.

Further, the invention claimed in claim 5 is constructed so that in the image data interpolating apparatus of claim 4, the margin processing unit enlarges the margin of the image data with respect to an interpolating process in which information outside the margin is drawn in.

In the invention of claim 5 thus constructed, when there is an interpolating process in which information outside the margin is drawn in, the margin is enlarged as described above and the interpolating process is then performed. The post-interpolation image data is written onto the output region etc. When the interpolating process draws in information outside the margin, information is diluted since information of a part containing no pixels is drawn in, which influences the margin. On the other hand, when the margin is previously enlarged, the influenced margin is concealed under the margin of the adjacent image data, whereupon the influence is eliminated.

There are various types of image data, which can mainly be classified into metacommand image data and non-metacommand image data. As an example suitable for such a case, the invention claimed in claim 6 is constructed so that in the image data interpolating apparatus of any one of claims 1 to 5, said plurality of types of image data having different image types include image data corresponding to a metacommand and other image data, which further comprises a non-metacommand pixel interpolating unit which enlarges a marginal region when the pixel corresponding to the image data other than the metacommand and performs an interpolating process so that a predetermined interpolation scale factor is obtained, and a metacommand pixel interpolating unit which generates an interpolated pixel so that the interpolated pixel corresponds to the original metacommand when reading out the pixel corresponding to the metacommand and performing an interpolating process so that the interpolating scale factor is obtained, wherein the synthesizing unit synthesizes a result of interpolation by the non-metacommand pixel interpolating unit and a result of interpolation by the metacommand pixel interpolating unit, the synthesizing unit preferring the result of interpolation by the metacommand pixel interpolating unit with respect to the superposed portion.

In the invention of claim 6 thus constructed, the non-metacommand pixel interpolating unit reads out from the virtual region etc. the pixels corresponding to the image data other than the metacommand and performs an interpolating process so that a predetermined interpolation scale factor is obtained. In this case, the interpolating process is performed with the marginal region being enlarged. Accordingly, an interpolated image enlarged relative to the original region is obtained. On the other hand, the metacommand pixel interpolating unit also reads out from the virtual region etc. the pixels corresponding to the metacommand and performs an interpolating process so that the predetermined interpolation scale factor is obtained. In the interpolating process, the interpolated pixels are generated so as to correspond to the original metacommand. The synthesizing unit synthesizes a result of interpolation by the non-metacommand pixel interpolating unit and a result of interpolation by the metacommand pixel interpolating unit. The synthesizing unit prefers the result of interpolation by the metacommand pixel interpolating unit with respect to the superposed portion.

More specifically, the metacommand image is a mass of dot-matrix pixels in the virtual region etc. The metacommand image has a smoothed contour corresponding to the original metacommand in the interpolating process, but the contour is necessarily changed from that before the interpolating process. When the contour is thus changed, a part of the metacommand image may be superposed on the adjacent image other than the metacommand or a gap may be formed. On the other hand, the image other than the metacommand is generated so as to be larger than the original and accordingly, there is less possibility of occurrence of the gap and the image of the metacommand is preferred in the superposed portion. Consequently, a smoothed contour remains.

The metacommand used here means a vectorial representation of shape. Accordingly, a drawing application would translate the command, drawing a graphic, and the image quality is not deteriorated eve if enlargement or reduction are repeated. On the other hand, information about each pixel is given when the image other than the metacommand is drawn. The information is lost when the image is reduced and cannot be returned even when the image is enlarged. In this sense, the metacommand is used for characters as well as for images.

The characteristic of the metacommand having such a property cannot always be maintained in the processing by a computer. Accordingly, when the metacommand is represented as a mass of pixels at one time, it needs to be subjected to the same processing as applied to the other image thereafter. However, when whether an image has been drawn by the metacommand, the interpolating technique needs to be changed in the interpolating process in which the image is enlarged. For example, it is considered that an image by the metacommand should generally be interpolated with a margin being smoothed. On the other hand, whether the margin should be smoothed cannot be determined unconditionally regarding the other image. Accordingly, when the metacommand and non-metacommand images are interpolated in the manners different from each other, marginal configurations may differ after the interpolating processes. This is the background of the present invention.

The virtual drawing unit carries out drawing on the virtual region on the basis of the image data corresponding to the metacommand and the other image data. The virtual drawing unit is capable of recognizing the image data corresponding to the metacommand and the other image data from each other. Various techniques rendering the recognition possible may be employed. For example, an attribute area may separately be provided so that types of the individual data in the virtual region are written thereon, or the individual data may be provided with respective attributes. Further, when the number of colors can be reduced, a certain bit can be applied to the attribute.

The non-metacommand pixel interpolating unit reads out from the virtual region the pixels corresponding to the image data other than the metacommand, carrying out the interpolating process. For example, when the type of the image data can be determined from the attribute area, the non-metacommand pixel interpolating unit reads out the pixels corresponding to the image data other than the metacommand while making reference to the attribute area to select the image data. The non-metacommand pixel interpolating unit further interpolates the pixels by the corresponding interpolating process.

Various interpolating manners can be employed. For example, the interpolating process by the cubic method is suitable for the natural image, whereas the nearest method is suitable for the non-natural image such as computer graphics.

The non-metacommand pixel interpolating unit enlarges the peripheral edge region and then carries out the interpolating process. Various processing manners for enlarging the peripheral edge region are employed. As an example, the invention claimed in claim 7 is constructed so that in the image data interpolating apparatus of claim 6, the non-metacommand pixel interpolating unit uses information about the pixel in the marginal region as information about a pixel outside the marginal region.

In the invention of claim 7 thus constructed, since the peripheral edge region to be enlarged contains no information about pixels, information about pixels in a peripheral region is used as information about pixels in a region to be enlarged. Accordingly, the information may be copied without change or with stepwise changes. Further, copying may be carried out using a working region. Thus, an actually copying work may not be carried out and it is sufficient that the information is substantially usable. The size of the region to be enlarged is not limited particularly. The size of the region depends upon irregularity of the margin resulting from generation of pixels by the metacommand pixel interpolating unit. Even when the metacommand pixel has a concavity, the concavity is allowed to such an extent that the concavity does not result in a gap in the superposition of the image data. For example, when pixel information is read out for every line from the virtual region, a processing for enlarging both ends of the metacommand pixel by one pixel is sufficient.

The metacommand pixel interpolating unit selectively reads out the pixel corresponding to the metacommand from the virtual region. The metacommand pixel interpolating unit generates an interpolation pixel corresponding to the original metacommand. For example, when the pixel is taken as an image, smoothing a margin or rendering a corner acute corresponds to this processing.

On the other hand, a metacommand representative of a character contains information about a figure bending in a complicated manner in a small region. Accordingly, an extra dot tends to be generated depending upon an operational accuracy in generation of pixels. As an example suitable for this characteristic, in the interpolating process for the metacommand representative of the character, a noise pixel in the generation of pixels on the basis of the metacommand may be deleted and the pixels may then be interpolated.

In the above-described construction, determination is made as to whether the pixel is a noise pixel when the pixels are generated on the basis of the metacommand representative of the character. When the pixel is a noise pixel, the noise pixel is deleted and the pixel is then interpolated. Whether the pixel is a noise pixel can generally be determined from a property of the character. For example, one pixel projects in spite of a straight portion. An unnaturally projecting pixel is in a portion where two sides intersect. Or an unnaturally projecting pixel is at an end of a curve. That is, the noise pixel means those which can be produced at a connection in the case where a character is represented by a plurality of vector data.

On the other hand, a superposing unit synthesizes the result of interpolation by the non-metacommand pixel interpolating unit and the result of interpolation by the metacommand pixel interpolating unit and causes the result of interpolation by the metacommand pixel interpolating unit to take preference over the result of interpolation by the non-metacommand pixel interpolating unit concerning a superposed portion.

As an example of the processing in which one takes preference over the other, the invention claimed in claim 8 is constructed so that in the image data interpolating apparatus of any one of claims 1 to 7, the synthesizing unit synthesizes the pixels, superposing pixels in the result of interpolation by the metacommand pixel interpolating unit other than background pixels on the result of interpolation by the non-metacommand pixel interpolating unit.

In the invention of claim 8 thus constructed, the results of interpolating processes held in another area may be superposed in a predetermined sequence if the result of interpolation by the non-metacommand pixel interpolating unit and the result of interpolation by the metacommand pixel interpolating unit are preliminarily held in the another area. Alternatively, the results of interpolation may be superposed while the interpolating processes are carried out in a predetermined sequence.

The aforesaid image data interpolating technique should not be limited to the substantial apparatus. It can easily be understood that the technique is functioned as a method.

The aforesaid image data interpolating apparatus may exist independently or may be incorporated in equipment. Thus, the scope of the invention covers various forms of implementation. Accordingly, the invention may be implemented as software or hardware.

When the invention is implemented as software for an image data interpolating apparatus, the invention applies equally to a medium on which the software is recorded.

When the invention is implemented as software, hardware and operating system can be employed or the invention may be implemented independent of them. For example, a process for inputting image data for the interpolation can be accomplished by calling a predetermined function in an operating system or by inputting from hardware without calling the function. Even when the invention is actually implemented under interposition of hardware, it can be understood that the invention can be implemented only by a program in a stage of recording the program on a medium and circulating the medium.

The recording medium may be a magnetic recording medium or a photomagnetic recording medium, or any recording medium that will be developed in the future. Further, the invention may take such a replicated form as a primary replicated product, secondary replicated product, etc. In addition, the invention may be supplied through use of a communication line.

Still more, there may be provided such as arrangement that some parts of the present invention are embodied in software while the other parts thereof are embodied in hardware. In a modified embodiment of the invention, some parts thereof may be formed as software recorded on a storage medium to be read into hardware as required.

BRIEF DESCRIPTION OF THE DRAWINGS

FIGS. 18A to 18C show a concrete data processing technique for pattern matching;

FIGS. 21A and 21B show a case where image data is read out for every type;

FIGS. 24A to 24D show a countermeasure against the inadequacy and its effect;

FIG. 25 shows an effect which smoothens the margin;

FIGS. 29A to 29D show a process of eliminating noise dot in a character by pattern matching;

FIGS. 32A to 32C show a case where image data is read out for every type and a margin extending process;

FIGS. 33A and 33B show a case where image data is read out into a buffer-for every type; and FIGS. 34A to 34D show the condition where the margin is extended by the margin extending process.

DETAILED DESCRIPTION OF THE PREFERRED EMBODIMENT

One embodiment of the present invention will be described with reference to the drawings.

Figure 1:
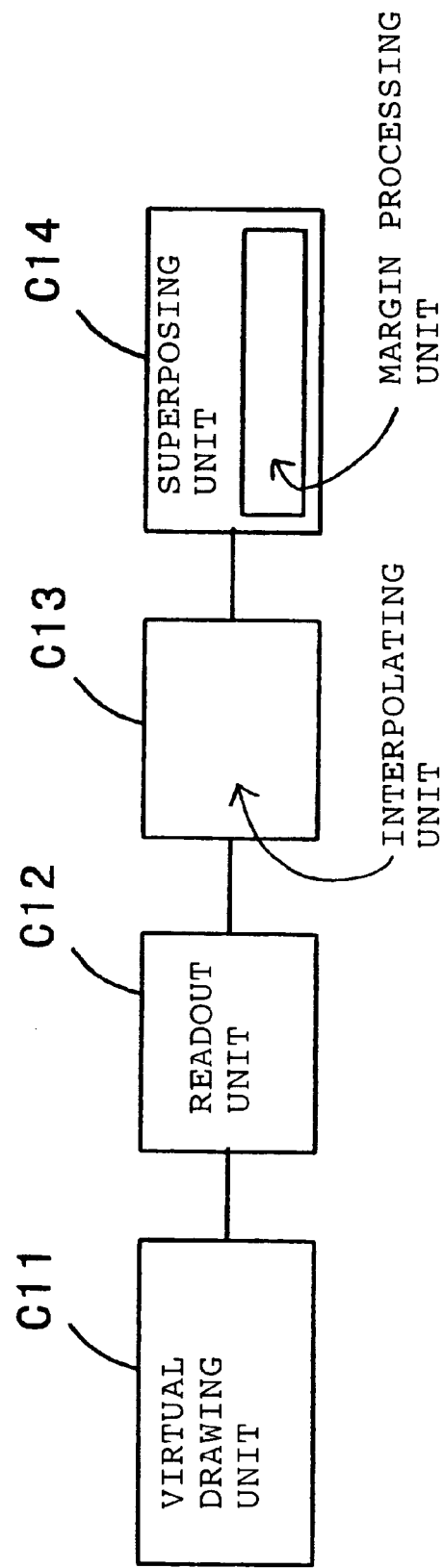
FIG. 1 is a block diagram showing an image data interpolating apparatus of one embodiment in accordance with the present invention.
Figure 2:
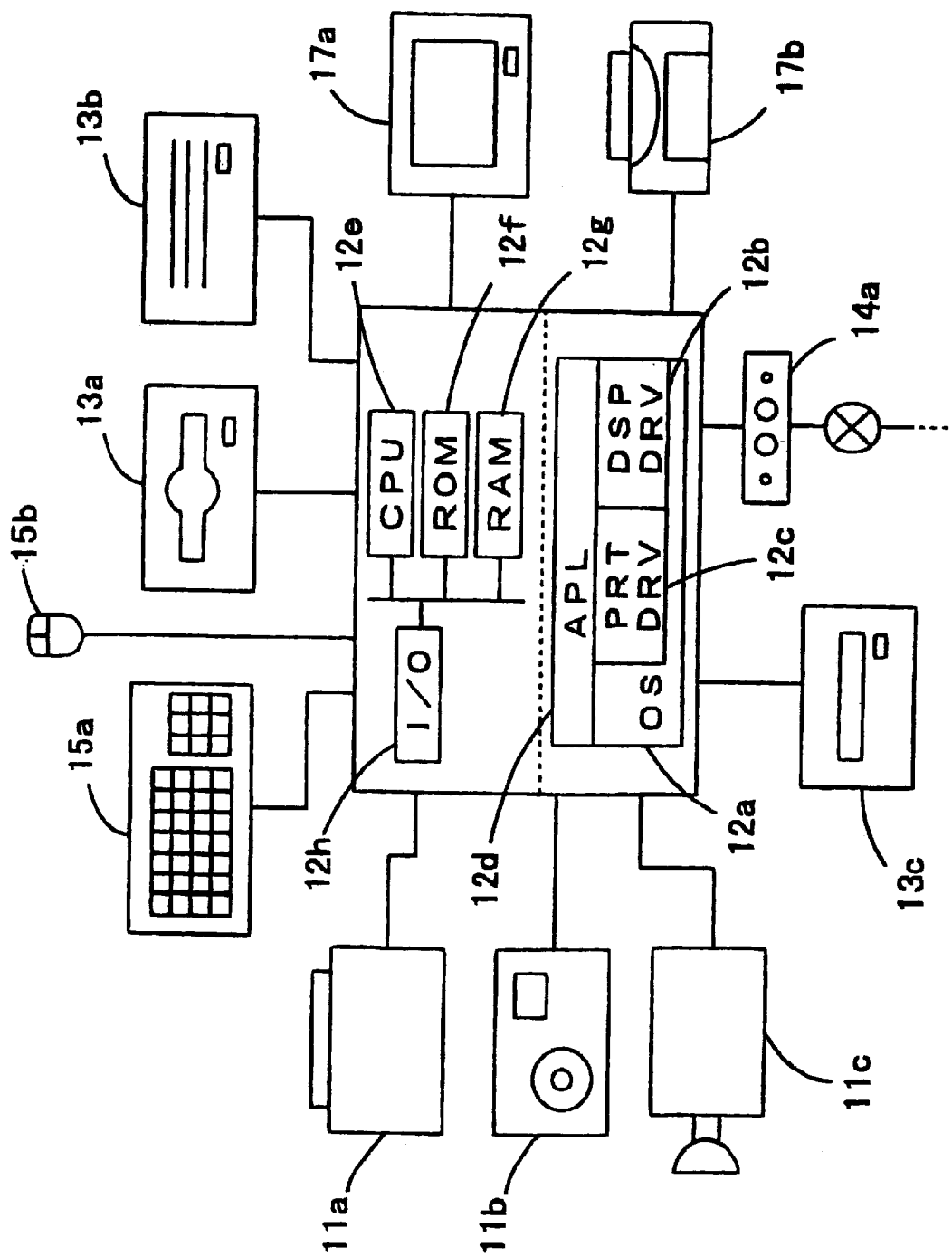
FIG. 2 is a block diagram showing a concrete example of hardware for the image data interpolating apparatus.

FIG. 1 is a block diagram showing an image data interpolating apparatus of one embodiment in accordance with the present invention, and FIG. 2 is a block diagram showing hardware to which the invention is applied.

In data processing in computers etc., an image is represented by dot-matrix pixels, and image data is composed of number of data each indicative of a pixel. An image should not be limited to a natural image such as photograph. A character can be an image in the sense that the character is a collection of pixels. Computer graphics and business graph can be images. These are commonly image data but delicately differ from each other in the properties, and accordingly, the matching with an interpolating process differs from one another according to the properties.

In view of the differences of image properties, a virtual drawing unit C11 reads a plurality of types of image data having different image properties, renders the types distinguishable, superposes the image data in a predetermined sequence, and draws on a virtual region etc. On the other hand, a readout unit C12 and an interpolating unit C13 read out the image data of every pixel for every attribute from the distinguishable virtual region and interpolate the pixels by an interpolating process according to the property of the image. A superposing unit C14 as an example of synthesizing unit writes image data interpolated according to the property of the interpolating process onto a predetermined output area in a superposed state.

The embodiment employs a computer system 10 as an example of hardware realizing the image data interpolating apparatus.

FIG. 2 is a block diagram showing the computer system 2. The computer system 10 includes as an image input device a scanner 11a, a digital still camera 11b and a video camera 11c all of which are connected to a computer 12. Each input device generates image data representing an image as dot-matrix pixels and is capable of outputting the image data to the computer 12. The image data is represented in three primary colors of RGB in 256 gradations so that about 16 million and 700 thousand colors can be represented.

A floppy disk drive 13a, a hard disk 13b and a CD-ROM drive 13c each serving as an external auxiliary storage are connected to the computer 12. Main programs relating to the system are recorded on the hard disk 13b. Other required programs are read from a floppy-disk or CD-ROM as the occasion may demand.

Further, a modem 14a serving as a communication device which connects the computer 12 to an external network etc. is connected to the computer 12. The modem 14a is further connected to the external network via a public communication line through which software and data can be downloaded. Although an operator externally accesses via the modem 14a and the public communication line in the embodiment, a LAN adapter may be provided for the operator to access the network, instead. Additionally, a keyboard 15a and a mouse 15b are provided for operation of the computer 12.

The computer system 10 further includes a display 17a and a color printer 17b each serving as an image output device. The display 17a has a display area of 800×600 pixels in the horizontal and vertical directions respectively, so that about 16 million and 700 thousand colors can be displayed for every picture element as described above. However, this is only one example of resolution. The resolution of the display 17a may be variable, for example, it may be 640× 480 pixels or 1024×720 pixels.

On the other hand, the color printer 17b, which is an ink-jet printer, is capable of printing an image with dots on printing paper serving as a recording medium using four color inks of CMYK. The color printer 17b has an image density of 360×360 dpi or 720×720 dpi and can thus perform a high-density printing. The color printer 17b has two gradations as to whether color ink is applied or not.

Predetermined programs are executed in the computer 12 so that the image data input by the image data input device is displayed or otherwise output by the image output device. Of these programs, an operating system (OS) 12a as a basic program runs on the computer 12. A display driver (DSP DRV) 12b and a printer driver (PRT DRV) 12c are incorporated in the operating system 12a. The display driver 12b instructs the display 17a to perform a displaying function, whereas the printer driver 12c instructs the dolor printer 17b to perform a printing function. These drivers 12b and 12c depend on the types of the display 17a and color printer 17b respectively and can accordingly be added or changed according to the respective types. Further, additional functions other than standard processes may be accomplished depending on the respective types of the display 17a and color printer 17b. In other words, various additional processes can be accomplished within allowable ranges while a common processing system is maintained on the standard system of the operating system 12a.

An application 12d is executed on the operating system 12a serving as the basic program. The application 12d has various processing contents. For example, it monitors operations of a keyboard 15a and a mouse 15b each serving as an operating device. When each device is operated, the application 12d controls the external equipment so that the corresponding computation processing is carried out. The application 12d further displays the results of processing on the display 17a or output them to the color printer 17b.

In the above-described computer system 10, a scanner 11 serving as an image input device reads a photograph etc. to obtain image data. Further, the application 12d for a word processor etc. can stick read photograph image or business graph based on the results of tabular computation as well as document. Such a consolidated document can be output to the display 17a or color printer 17b each serving as an image output device to be displayed. The consolidated documents differ in the character, photograph or business graph but are common in a point that an image is constituted by a collection of pixels.

When the consolidated document is output to be displayed, pixels displayed on the display 17a as they are cannot correspond to pixels on the color printer 17b. A pixel density in the case where the pixels are generated on the application 12d and displayed on the display 17a is not equal to one of the color printer 17b. Of course, there may be a case where the pixel density of the display 17a equals that of the color printer 17b. However, in many cases, the pixel density of the color printer 17b having an improved pixel density for high image quality is higher than that of the ordinary display 17a.

In view of the aforesaid problem, the operating system 12a determines a reference pixel density and executes a resolution conversion so that the difference between the reference density and the pixel density of an actual device is resolved. For example, when the display 17a has a resolution of 720 dpi and the operation system 12a has a reference resolution of 360 dpi, the display driver 12b executes the resolution conversion between them. Further, when the color printer 17b has a resolution of 720 dpi under the same condition, the printer driver 12c executes the resolution conversion between them.

The resolution conversion is a process for increasing the number of constituent pixels of the image data and accordingly corresponds to an interpolating process. Each of the display driver 12b and printer driver 12c has a function of executing the interpolating process.

In the embodiment, the display driver 12b or the printer driver 12c writes image data on a virtual screen for every type of the image data so that the image data is distinguishable and further reads out the image data for every type from the virtual screen, executes the interpolating process in a suitable interpolating technique, superposes the interpolated image data to output a final image to the display 17a or the color printer 17b, as will be described later. In this sense, the display driver 12b and the printer driver 12c constitute the above-described virtual drawing unit C11, the readout unit C12, the interpolating unit C13 and the superposing unit C14. The display driver 12b and the printer driver 12c are stored on the hard disk 13b and input to the computer 12 upon start of the computer system 10 to run. When put to work, these drivers recorded on a medium such as a CD-ROM or a floppy disk are installed on the hard disk. Accordingly, such a CD-ROM or floppy disk constitutes a medium on which an image data interpolating program is recorded.

Figure 3:
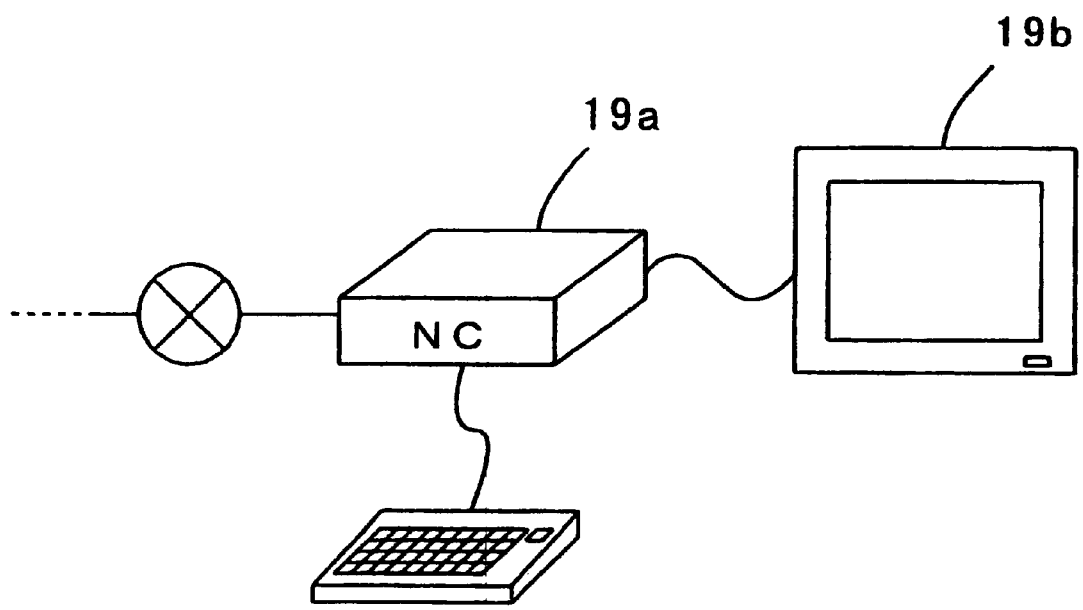
FIG. 3 is a schematic block diagram showing another example of application of the image data interpolating apparatus.

Although the image data interpolating apparatus is realized as the computer system 10 in the embodiment, the computer system is not necessarily required. A system in which the same interpolating process is required for a plurality of image data having differing properties of images may be provided, instead. For example, FIG. 3 shows a network computer 19a, which is connected via a public telephone line to an external wide-area network. In such a wide-area network, image data having different image properties including character information, photographic images, etc. are transmitted and received. The network computer 19a obtains such image data and displays the image data on a television monitor 19b or output the image data to a printer (not shown). In this case, too, the change of the image resolution is required, or when the operator wishes to enlarge a part of the image, the image is interpolated with an operation such as zooming and then displayed.

The interpolating process may be carried out at the side of a display output device but not at the computer side. In the example of a color printer, script type print data is input and the interpolating process is carried out in execution of matching with a printing resolution of the color printer.

Figure 4:
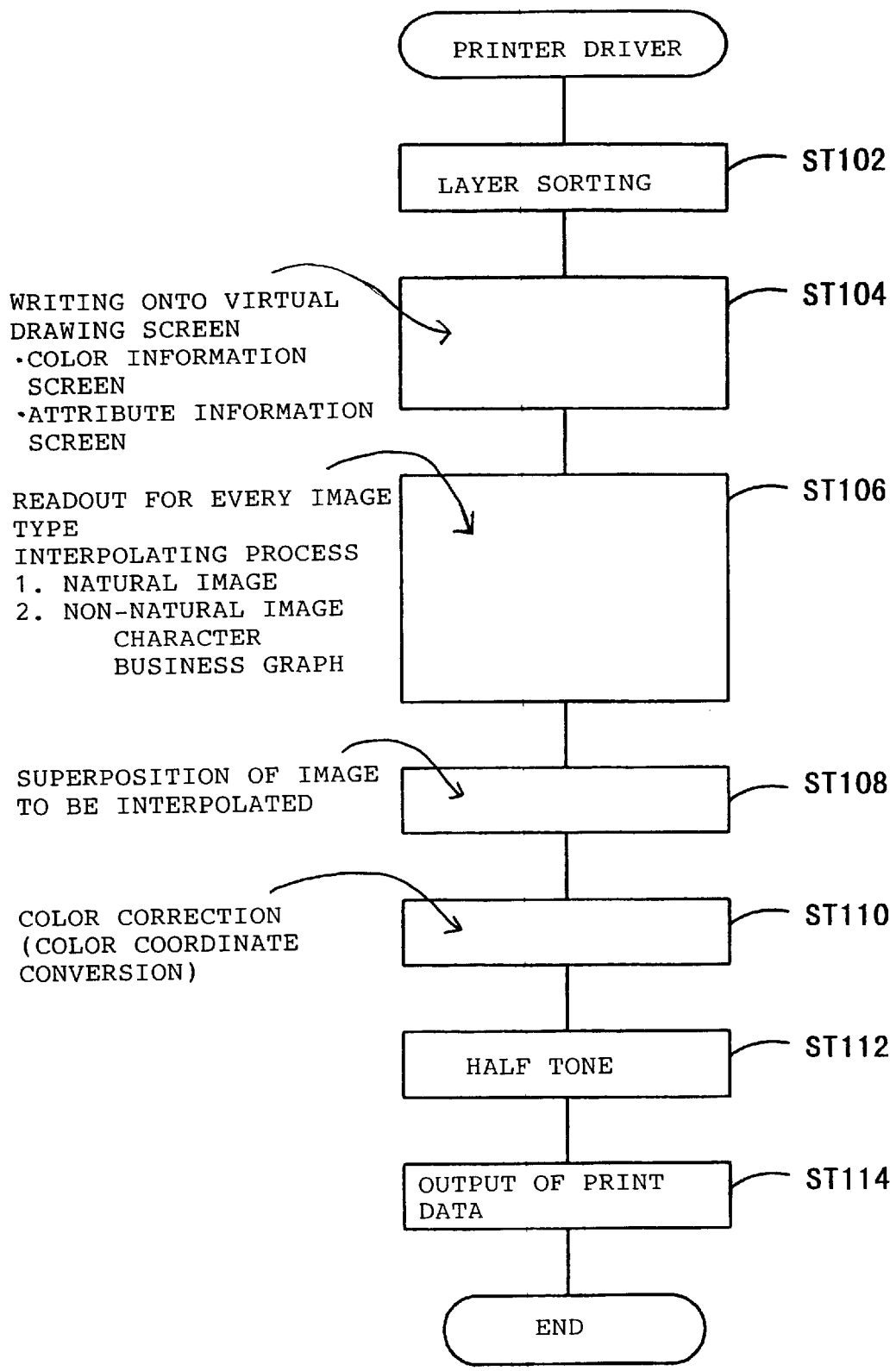
FIG. 4 is a flowchart of main processing of the image data interpolating apparatus of the invention.

FIG. 4 is a flowchart of the resolution conversion carried out by the printer driver 12c.

At step ST102, image data is input and sorted for superposition. More specifically, an image read from the scanner 11a on the application 12d, a character input on the keyboard 15a, and a business graph generated on tabular calculation software are stuck as a single consolidated document. Superposition is required in this case. Particularly in a field of DTP, an image and a character are directly superposed in most cases such that one picture is generated. A complicated superposition is required in this case. Although an image of a superposed lower layer is invisible, the image exists on the data and accordingly, the data is again superposed by the printer driver 12c. The concept of the layer is utilized when the images are superposed. A command of the image data is sorted so that the image data are arranged into upper and lower layers. The image data for the lower layer is written.

Figure 5:
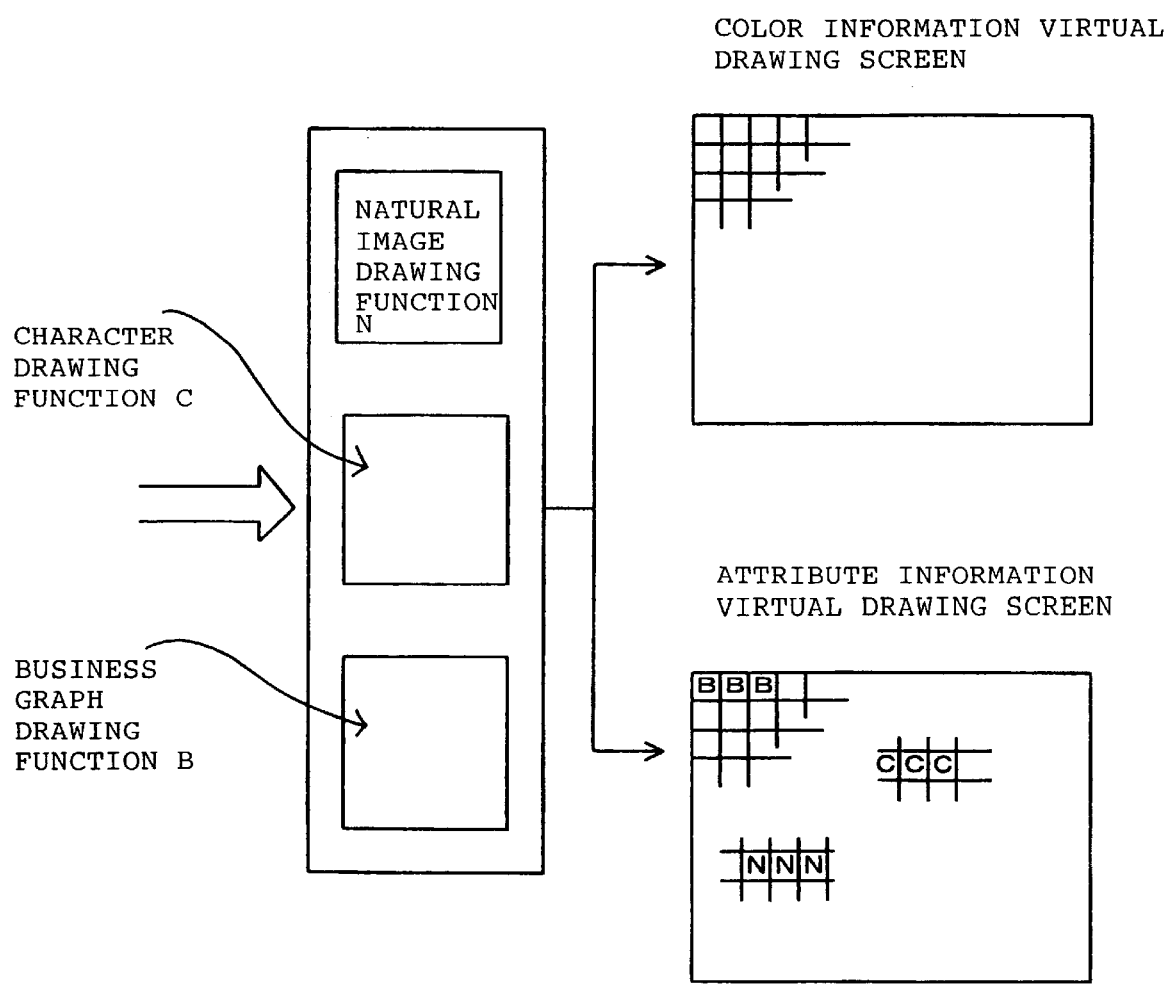
FIG. 5 shows writing onto a virtual drawing screen.

At step ST104, data is written onto a virtual drawing screen serving as a virtual region on the basis of the image data rearranged as described above. FIG. 5 typically shows writing onto the virtual drawing screen. When the commands of the image data are sorted on the basis of the arrangement of layers, drawing functions according to the respective sorted commands are called and data is written for every pixel onto a color information virtual drawing screen and an attribute information virtual drawing screen each which is allocated to a memory. Three bytes corresponding to respective color components of red, green and blue for every pixel are allocated to the color information virtual drawing screen. An allocated memory area equals the number of pixels in the horizontal direction multiplied by the number of pixels in the vertical direction. The attribute information virtual drawing screen is provided for determining what each pixel is, a natural image (N), a character (C) or a business graph (B). One byte is allocated for each pixel, and an identification code (N, C or B) of the attribute is written onto the attribute information virtual drawing screen. Bit map image data is treated as a natural image. However, since the bit map image data is not always a natural image in the strict sense, the image data may be analyzed so that whether the image data is a natural image is determined.

Figure 6:
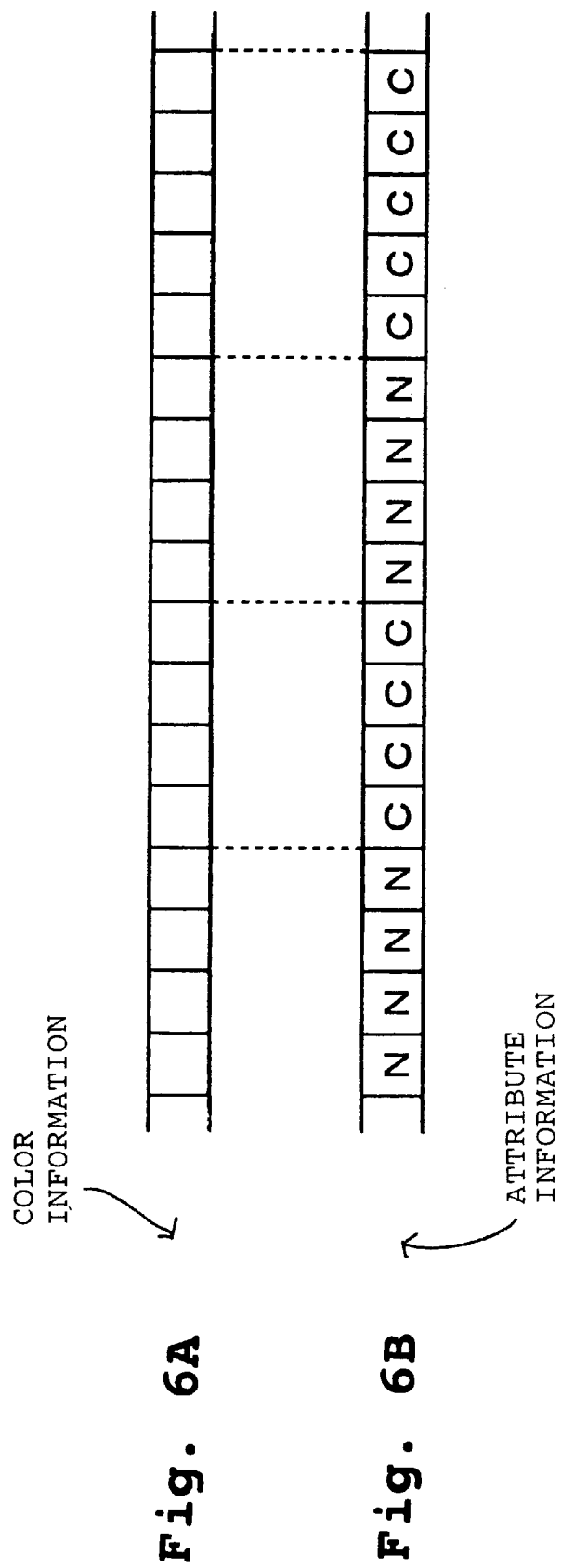
FIGS. 6A and 6B show comparison of color information and attribute information on the virtual drawing screen.

FIGS. 6A and 6B show a correspondence between the color information virtual drawing screen and the attribute information virtual drawing screen. When one line in the horizontal direction at a reference resolution is supposed, the color and the type of each pixel is written. Accordingly, a pixel of a natural image, a character or a business graph can be selected from the written attribute information.

Although the attribute information and the color information are separately written onto the virtual drawing screen in this example, a writing manner should not be limited to this. For example, four bytes may be allocated to each pixel, that is, one byte for the attribute information may be added to the color information. Further, a screen onto which superposition information is written may be separated from a screen onto which color information is written for every type, and the superposition may be carried out while the superposition information is referred to.

At step ST106, image data is read out for every image type from a virtual drawing screen as shown in FIG. 5, and an optimum interpolating process according to the image type is carried out. Techniques for the interpolating process prepared in the embodiment will be described.

Figure 7:
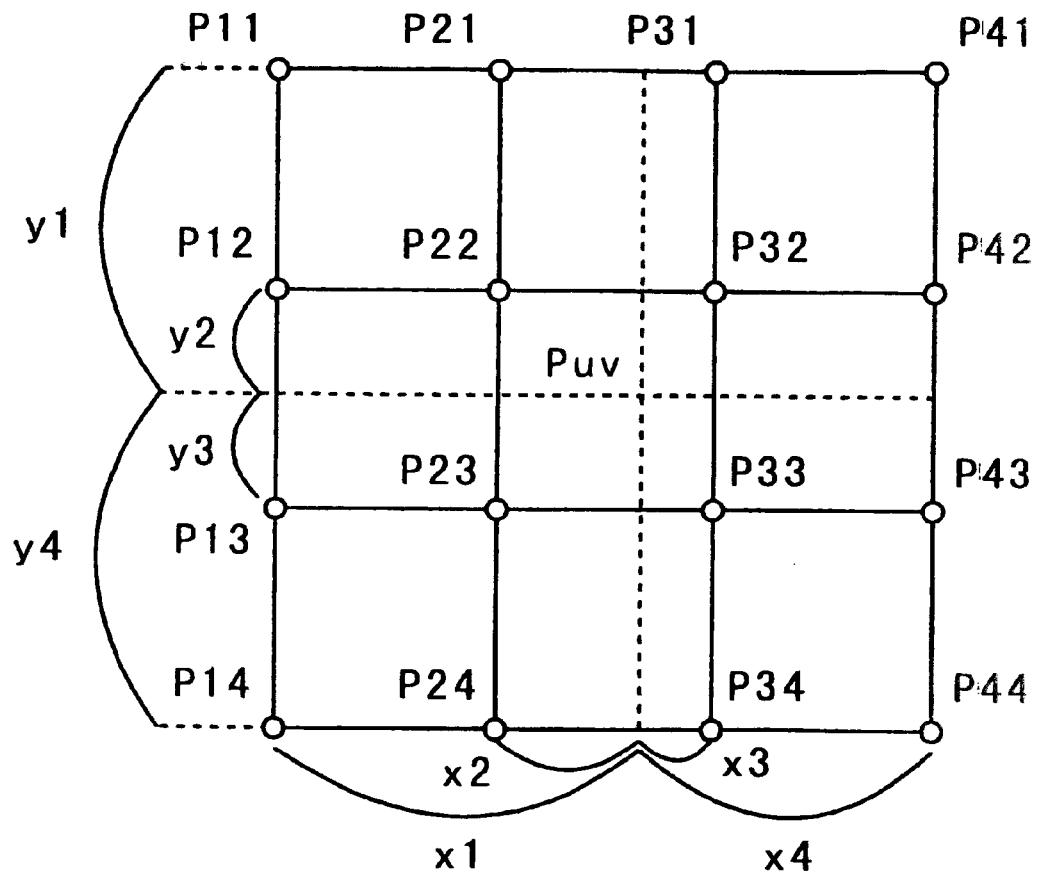
FIG. 7 shows the concept of the cubic method.

As an interpolating process suitable for a natural image such as photograph, the interpolating process by a cubic method is executable. The cubic method utilizes data of sixteen lattice points, that is, four lattice points surrounding a point Puv to be interpolated and lattice points outside the four lattice points, as shown in FIG. 7. An equation using a cubic convolution function is expressed as follows:

$$P = [f(y1) f(y2) f(y3) f(y4)] \begin{pmatrix} P11 & P21 & P31 & P41 \\ P12 & P22 & P32 & P42 \\ P13 & P23 & P33 & P43 \\ P14 & P24 & P34 & P44 \end{pmatrix} \begin{pmatrix} f(x1) \\ f(x2) \\ f(x3) \\ f(x4) \end{pmatrix}$$

The degree of influence according to the distance is expressed by a cubic convolution function as:

$$f(t) = \{\sin(\pi t)\}/\pi t.$$

Each of the distances x1 to x4 and y1 to y4 is obtained using an absolute coordinate value (u, v) of the lattice point Puv as:

$$x1 = 1 + (u - |u|) \quad y1 = 1 + (v - |v|)$$
$$x2 = (u - |u|) \quad\quad y2 = (v - |v|)$$
$$x3 = 1 - (u - |u|) \quad y3 = 1 - (v - |v|)$$
$$x4 = 2 - (u - |u|) \quad y4 = 2 - (v - |v|)$$

On the above assumption, the aforesaid equation is expanded as follows:

$$P = [f(y1) f(y2) f(y3) f(y4)]$$

$$\begin{pmatrix} P11 \cdot f(x1) + P21 \cdot f(x2) + P31 \cdot f(x3) + P41(x4) \\ P12 \cdot f(x1) + P22 \cdot f(x2) + P32 \cdot f(x3) + P42(x4) \\ P13 \cdot f(x1) + P23 \cdot f(x2) + P33 \cdot f(x3) + P43(x4) \\ P14 \cdot f(x1) + P24 \cdot f(x2) + P34 \cdot f(x3) + P44(x4) \end{pmatrix}$$

$$= f(y1)\{P11 \cdot f(x1) + P21 \cdot f(x2) + P31 \cdot f(x3) + P41(x4)\} +$$
$$f(y2)\{P12 \cdot f(x1) + P22 \cdot f(x2) + P32 \cdot f(x3) + P42(x4)\} +$$
$$f(y3)\{P13 \cdot f(x1) + P23 \cdot f(x2) + P33 \cdot f(x3) + P43(x4)\} +$$
$$f(y4)\{P14 \cdot f(x1) + P24 \cdot f(x2) + P34 \cdot f(x3) + P44(x4)\}$$

$$= P11 \cdot f(x1) \cdot f(y1) + P21 \cdot f(x2) \cdot f(y1) + P31 \cdot f(x3) \cdot f(y1) +$$
$$P41(x4) \cdot f(y1) + P12 \cdot f(x1) \cdot f(y2) + P22 \cdot f(x2) \cdot f(y2) +$$
$$P32 \cdot f(x3) \cdot f(y2) + P42(x4) \cdot f(y2) + P13 \cdot f(x1) \cdot f(y3) +$$
$$P23 \cdot f(x2) \cdot f(y3) + P33 \cdot f(x3) \cdot f(y3) + P43(x4) \cdot f(y3) +$$
$$P14 \cdot f(x1) \cdot f(y4) + P24 \cdot f(x2) \cdot f(y4) + P34 \cdot f(x3) \cdot f(y4) +$$
$$P44(x4) \cdot f(y4)$$

The degree of influence f(t) according to the distance is approximated by the following cubic equation:

$$f(t) = \{\sin(\pi t)\}/\pi t$$

$$\approx \begin{cases} 1 - 2|t|  2 + |t|  3 & : 0 \le |t| < 1 \\ 4 - 8|t| + 5|t|  2 - |t|  3 & : 1 \le |t| < 2 \\ 0 & : 2 \le |t| \end{cases}$$

In the cubic method, the degree of influence varies gradually as it approaches from one lattice point to the other lattice point. The cubic method has a characteristic that this variation of the influence becomes cubic.

Figure 8:
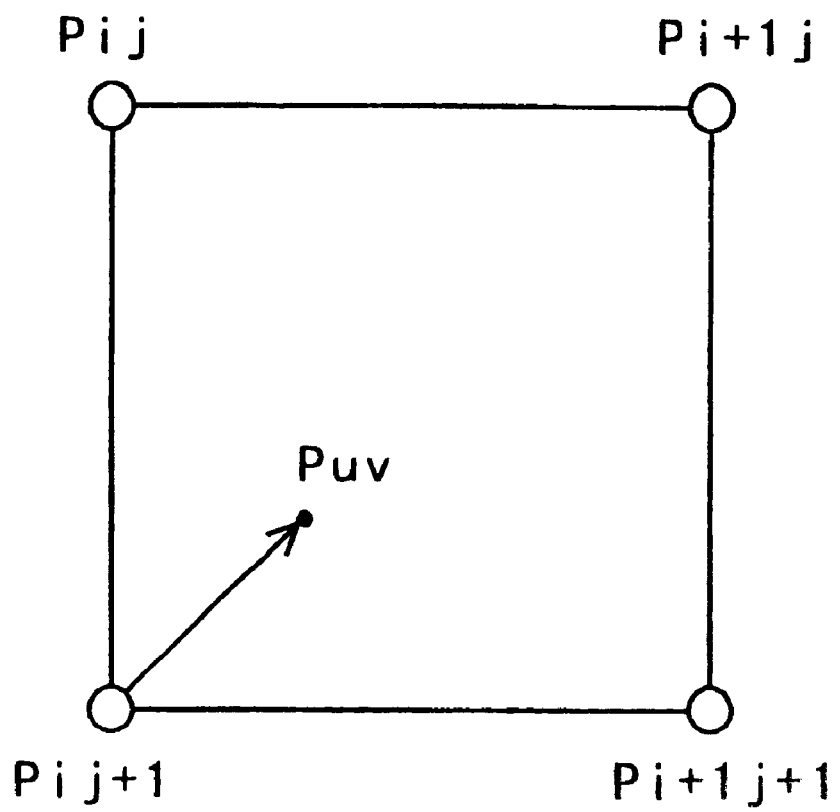
FIG. 8 shows the concept of the nearest method.

As an interpolating process suitable for a non-natural image such as computer graphics or business graph, the interpolating process by a nearest method is executable. In the nearest method, as shown in FIG. 8, distances between an interpolation point Puv and four peripheral lattice points Pij, Pi+1j, Pij+1 and Pi+1j+1 respectively are obtained. Data of the nearest lattice point is displaced to the interpolation point Puv. This is expressed by the following equation:

$$Puv = Pij$$

where i=[u+0.5] and j=[v+0.5], and each bracket indicates that an integral part is taken in the Gauss' notation.

Figure 9:
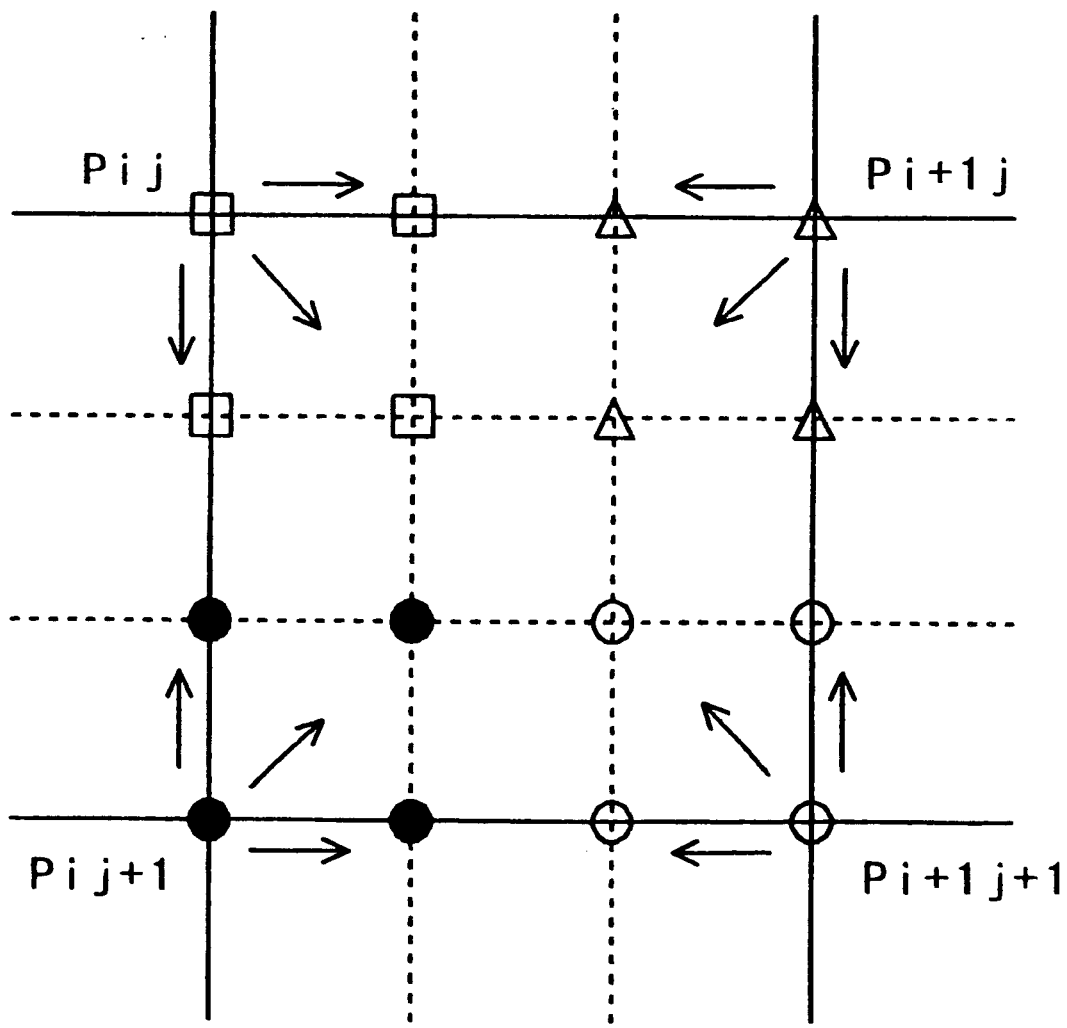
FIG. 9 shows a case where data of each lattice point is moved in the nearest method.
Figure 10:
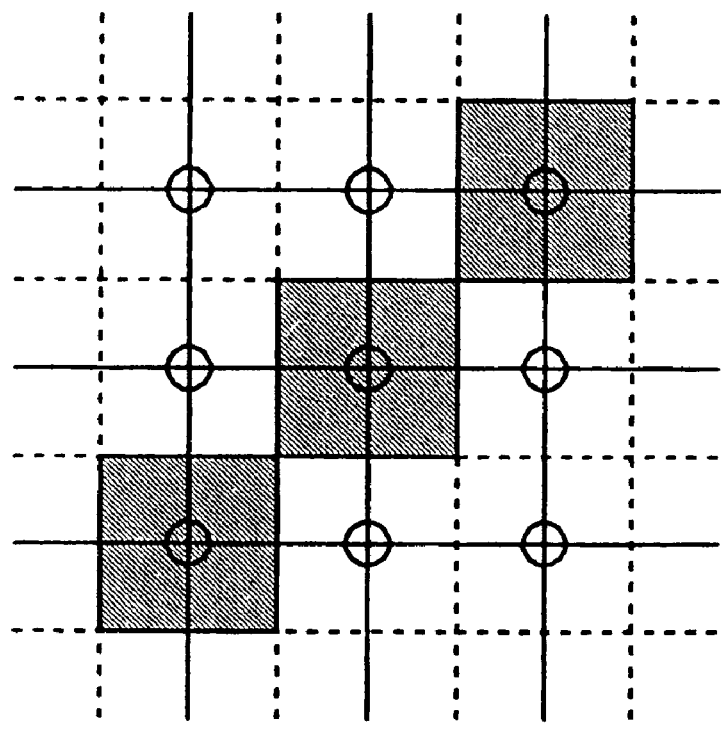
FIG. 10 is a schematic view showing the condition before interpolation by the nearest method.
Figure 11:
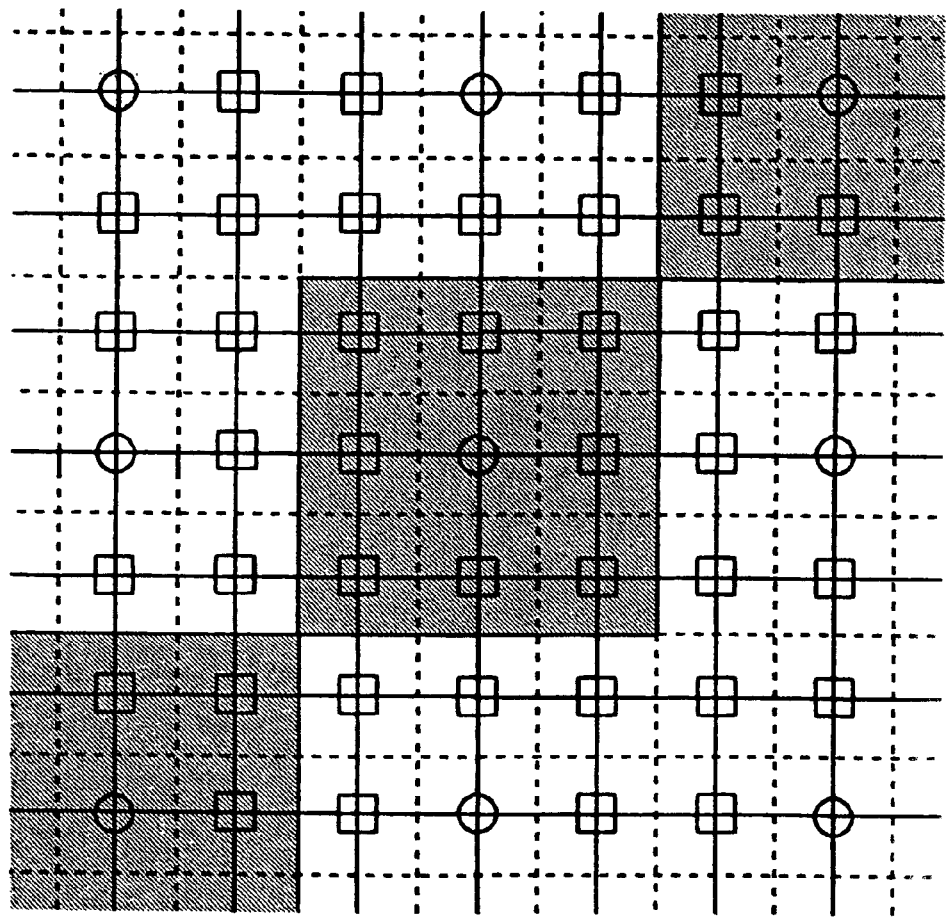
FIG. 11 is a schematic view showing the condition after interpolation by the nearest method.

FIG. 9 shows a case where the number of pixels is trebled both in the length and the width by the nearest method. The data of the nearest one of pixels at four corners is displaced as a pixel to be interpolated. FIG. 10 shows the original image and FIG. 11 shows an image obtained by interpolating the pixels in the above-described method. The relation between obliquely arranged black pixels and white pixels serving as the background in the original image is maintained in the interpolated image of FIG. 11 in which the black pixels are trebled in the number thereof and arranged obliquely.

In the nearest method, edges of the original image are maintained in the interpolated image without change. Accordingly, when the interpolated image is scaled up, jags are conspicuous although the edges are maintained. In other methods, on the other hand, the pixel to be interpolated is processed so as to be changed smoothly by using data of pixels around it. As a result, although jags are less conspicuous, part of the information of the original data is cut off such that the image is rendered edgeless. Accordingly, these other methods are unsuitable for the computer graphics or business graph.

Although the above-described nearest method and cubic method are used in the embodiment, a bilinear interpolation method will be described as another interpolation method in order that the characteristics of these methods may be understood.

Figure 12:
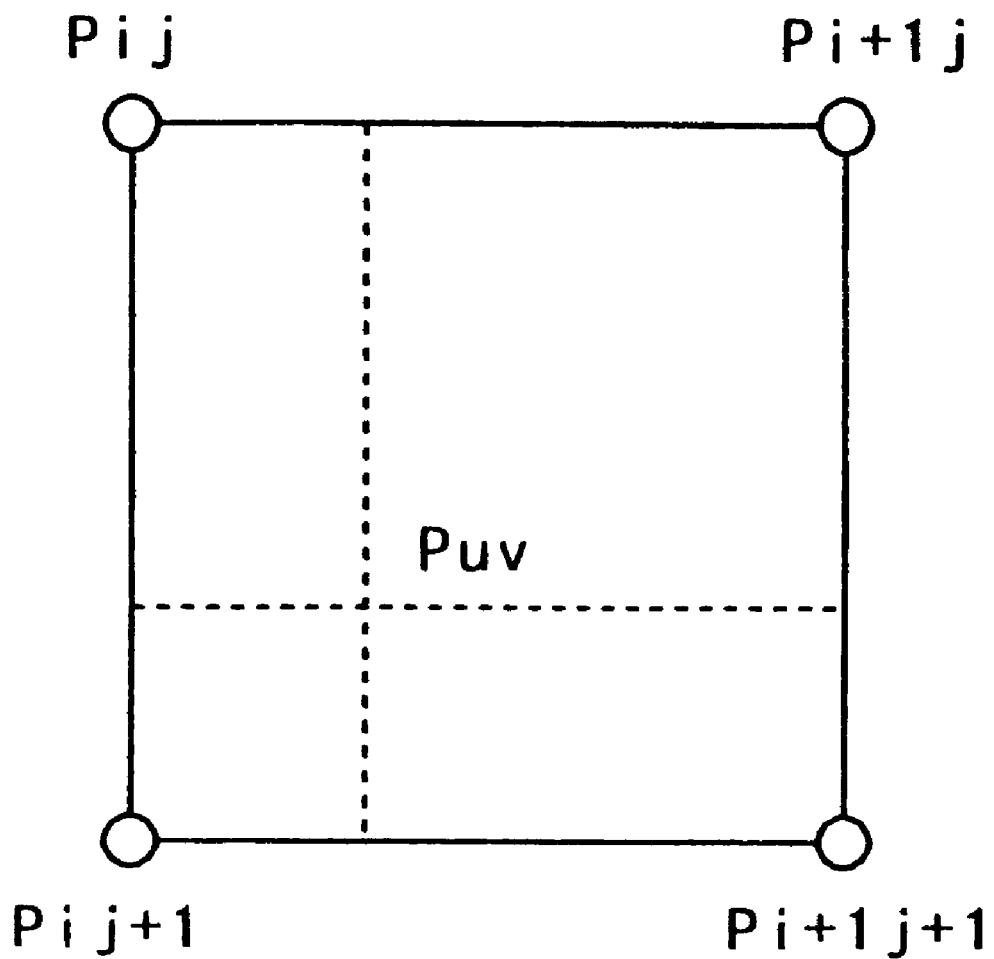
FIG. 12 shows the concept of the bilinear method.

The bilinear method is similar to the cubic method in that the influence degree varies gradually as it approaches from one lattice point to the other lattice point, as shown in FIG. 12. However, the bilinear method differs from the cubic method in that the variation is linear and depends upon only data of the lattice points at the opposite sides. More specifically, a region defined by the four lattice points Pij, Pi+1j, Pij+1 and Pi+1j+1 surrounding the interpolation point Puv is divided by the interpolation point into four subdivisions. Diagonally located data is weighted on the basis of area ratios among the subdivisions. This is expressed as the following equation:

$$P = \{(i+1) - u\}\{(j+1) - v\}Pij + \{(i+1) - u\}\{v - j\}Pij+1 + \{u - i\}\{(j+1) - v\}Pi+1j + \{u - i\}\{v - j\}Pi+1j+1$$

where i=[u] and j=[v].

Figure 13:
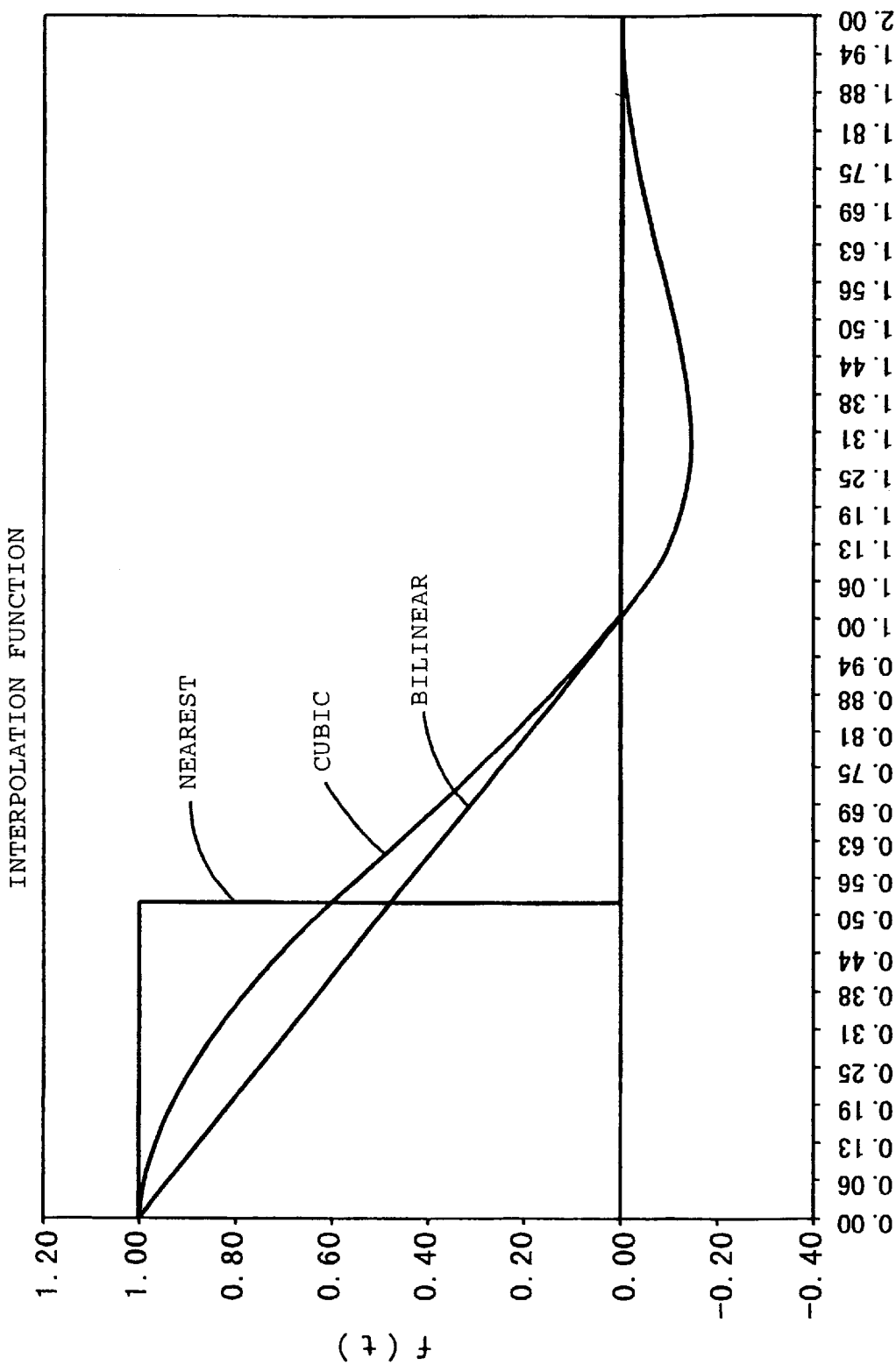
FIG. 13 is a graph showing variations in the interpolation function.

In each of the cubic method and the bilinear method, the influence degree varies gradually as it approaches from one lattice point to the other lattice point. However, the variation is cubic in the cubic method, whereas the variation is linear in the bilinear method. This difference is large. FIG. 13 shows the two-dimensional results of interpolations by the nearest, cubic and bilinear methods. The axis of abscissas denotes a location and the axis of ordinates denotes an interpolation function corresponding to the above-described influence degree according to the distance between the interpolation point and each lattice point. The lattice points exist at locations where t=0, t=1 and t=2, respectively. The interpolation points are at locations where t=0 and 1.

In the bilinear method, the interpolation function varies linearly between adjacent points (t=0 and 1). As a result, since marginal portions are smoothed, a resultant image is blurred on the screen. More specifically, when the marginal portions differ from corner portions and are smoothed, an original contour of the image is lost in the case of computer graphics and the image becomes out of focus in the case of photograph.

On the other hand, in the cubic method, the interpolation function gradually approximates the lattice point between the adjacent points (t=0 and 1), generating an upward convexity. Further, the interpolation function becomes downwardly concave between adjacent points (t=1 and 2). In other words, one edge portion is varied so as to have such a difference as not to produce a step. As a result, the sharpness is increased and no step is produced in the photograph. However, since an edge does not have any analogue change in the computer graphics, the cubic method is unsuitable therefor.

An interpolating process of pattern matching will now be described.

Figure 14:
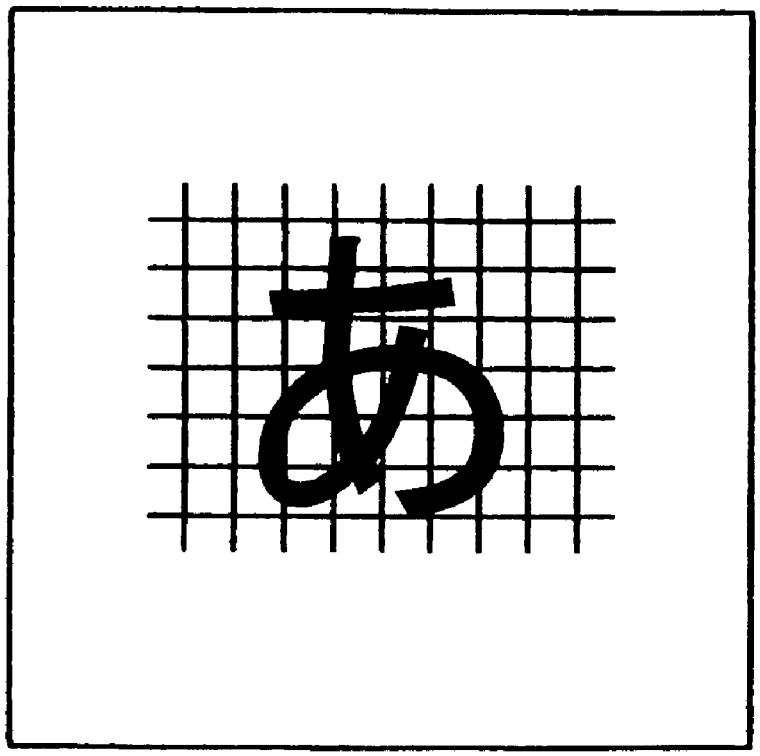
FIG. 14 shows a character image written on the color information virtual drawing screen.

FIG. 14 shows a character image written on the color information virtual drawing screen. The character is also composed of dot-matrix pixels arranged in the horizontal and vertical directions, and each dotted portion (●) is an image pixel, whereas each blank portion (○) is a background pixel.

Figure 15:
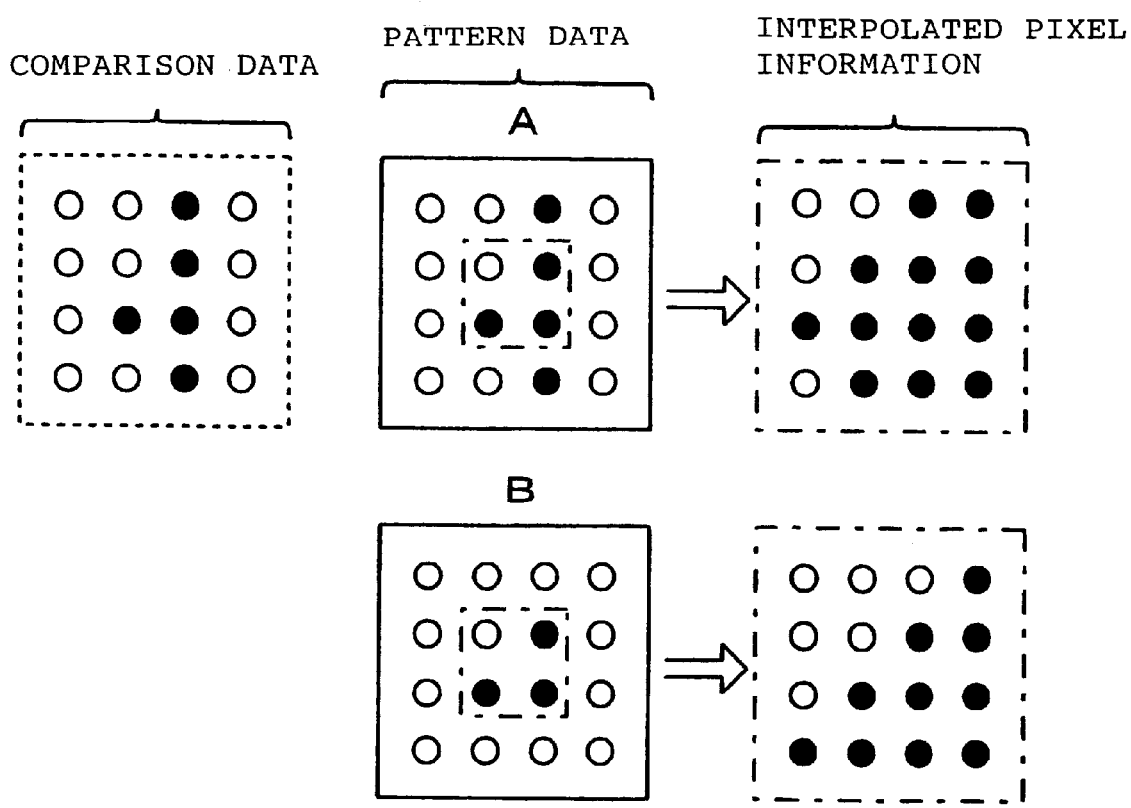
FIG. 15 shows a case where interpolation information is obtained by pattern matching.

In the pattern matching, one area comprising sixteen pixels serving as a square area of 4×4 pixels as shown in FIG. 15 is matched with a previously prepared pattern data, so that interpolating pixels are generated with respect to a square area comprising inner four pixels (2×2 pixels). Outside pixels are also referred to in spite of the square area of four pixels. The reason for this is that the result of interpolation for the square area of four pixels changes depending on whether peripheral pixels exist. FIG. 15 shows two pattern data, that is, the area matches the pattern data when the area comprises four pixels, whereas the area differs from the pattern when the area comprises sixteen pixels. In pattern data A, dots are arranged vertically with one dot projecting sideways. In pattern data B, three of four dots are dotted. In pattern data A, it is preferable that dots are arranged into an angled shape so that an image of projection is represented. When three pixels are added, they are preferably added so as to represent a triangle. Accordingly, an interpolation pixel pattern differs according to the pattern data.

Figure 16:
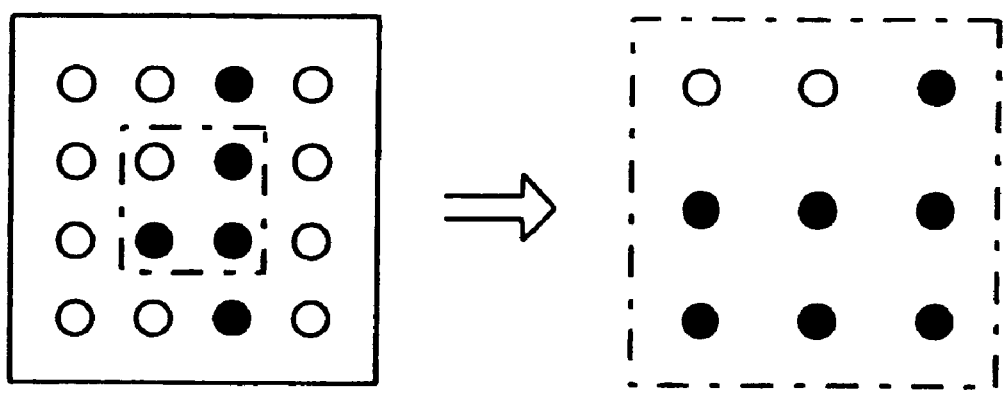
FIG. 16 shows a case where interpolation information is obtained by pattern matching in differing scale factors.

A plurality of sets of interpolation pixel patterns are prepared for every scale factor. FIG. 16 shows an example in which the scale factor is 1.5 in the vertical and horizontal directions.

Figure 17:
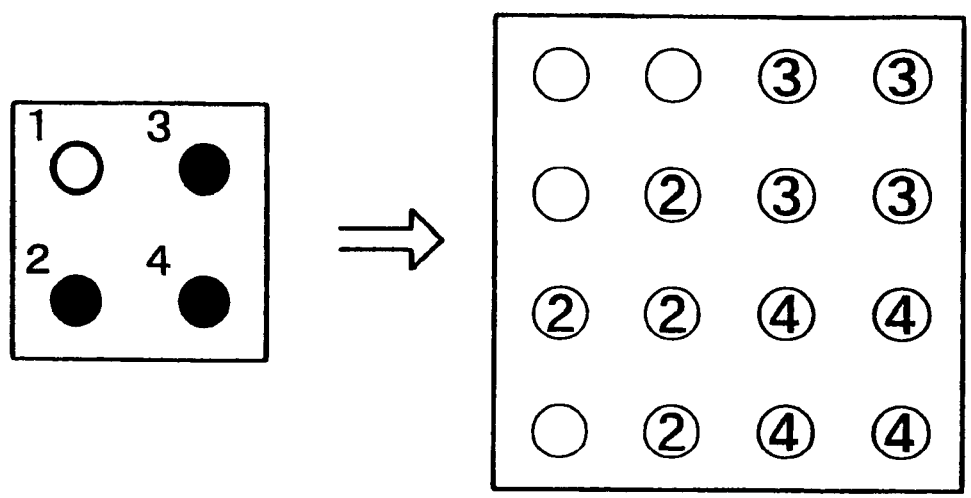
FIG. 17 shows a case where interpolation information including color allocation information is obtained by pattern matching.

When the pattern matching is applied to color data, a large number of pattern data should be prepared even in the example of four pixels. More specifically, the pattern matching results in combinations the number of which corresponds to permutations of the number of colors each pixel can take. In the embodiment, however, pattern comparison is carried out on the basis of presence or absence of dot and the color data is coped with by color allocation, whereupon the above-described problem is solved. FIG. 17 shows an example of such a case. The color data is compared with the pattern data comprising sixteen pixels as in the above-described example. Concerning four pixels, a color of each pixel is correlated with the interpolation pixels. Consequently, no previous processing for determining the colors of the interpolation pixels is required, and the number of pattern data is reduced, so that an amount of processing and an amount of resource are considerably reduced.

FIGS. 18A to 18C show a more concrete technique for pattern matching on the basis of sixteen pixels. FIG. 16A shows an arrangement of original pixels to be interpolated. The pattern matching is executed with a small area of sixteen pixels is displaced. The pattern matching is carried out while a small area of the sixteen pixels is displaced. In this case, not all the information about the sixteen pixels need be renewed every time the small area is moved. In FIG. 18A, object pixels are represented as "E, F, G, H, I, J, K, L, M, N, O, P, Q, R, S, and T." FIG. 18B shows a data register area of the CPU etc. for processing the small area. Whether each pixel is dotted is represented by one-bit of "1" or "0," so that the pattern matching can be carried out when data width of sixteen bits is provided. When the small area is moved by one pixel, four pixels of "A, B, C and D" are newly added to the small area, whereas four pixels of "Q, R, S and T" are excluded from the small area, as shown in FIG. 18C. Thus, the data register area is shifted by four bits and four bits corresponding to the four pixels of A, B, C and D" are introduced at LSB side.

Further, when sixteen bits are utilized as an address concerning the arrangement of pattern data, the matching process includes only an addressing process, whereupon the interpolation pixel information can be obtained.

Figure 19:
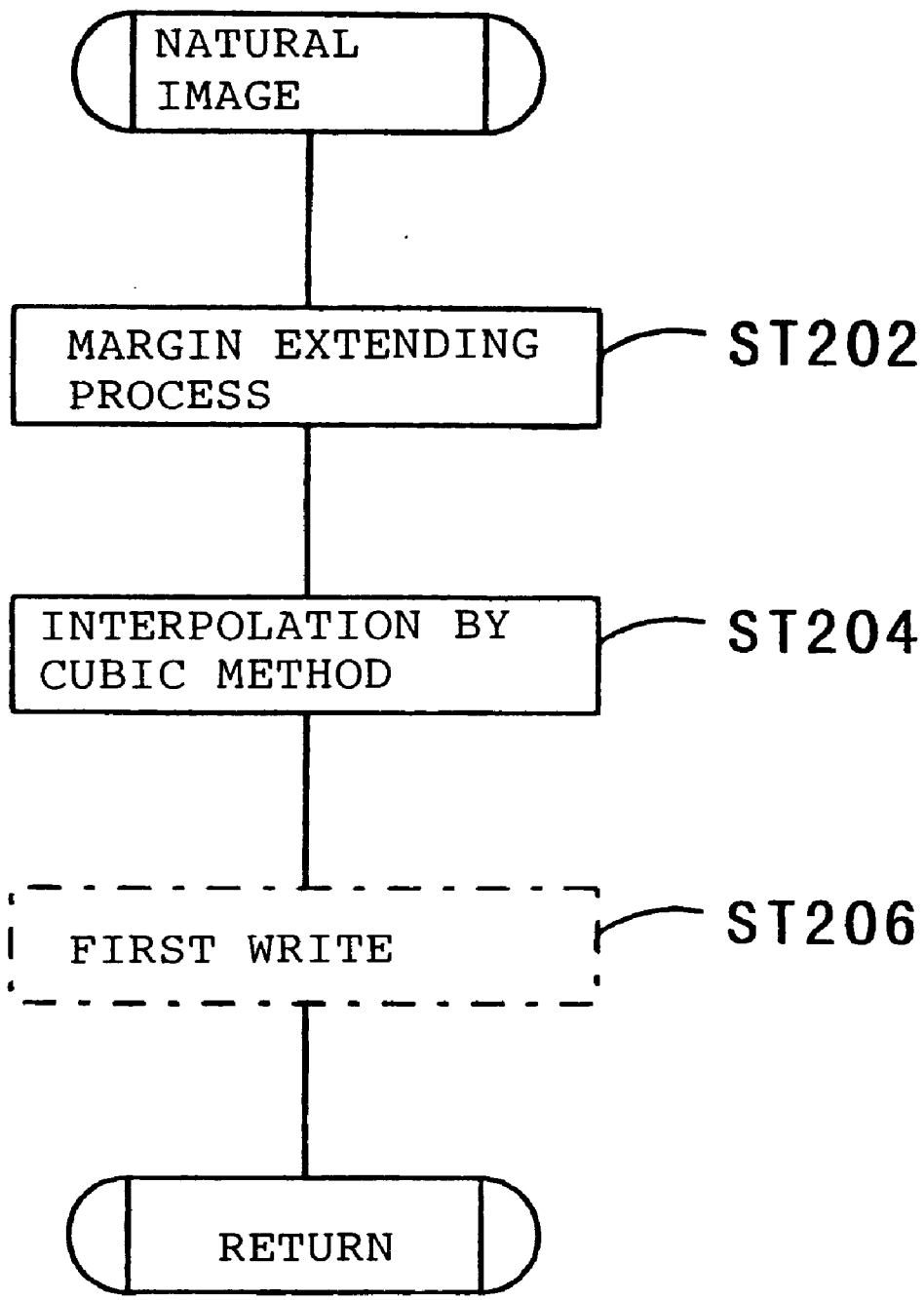
FIG. 19 is a flowchart showing the interpolation process for a natural image in the image data interpolating apparatus of the invention.
Figure 20:
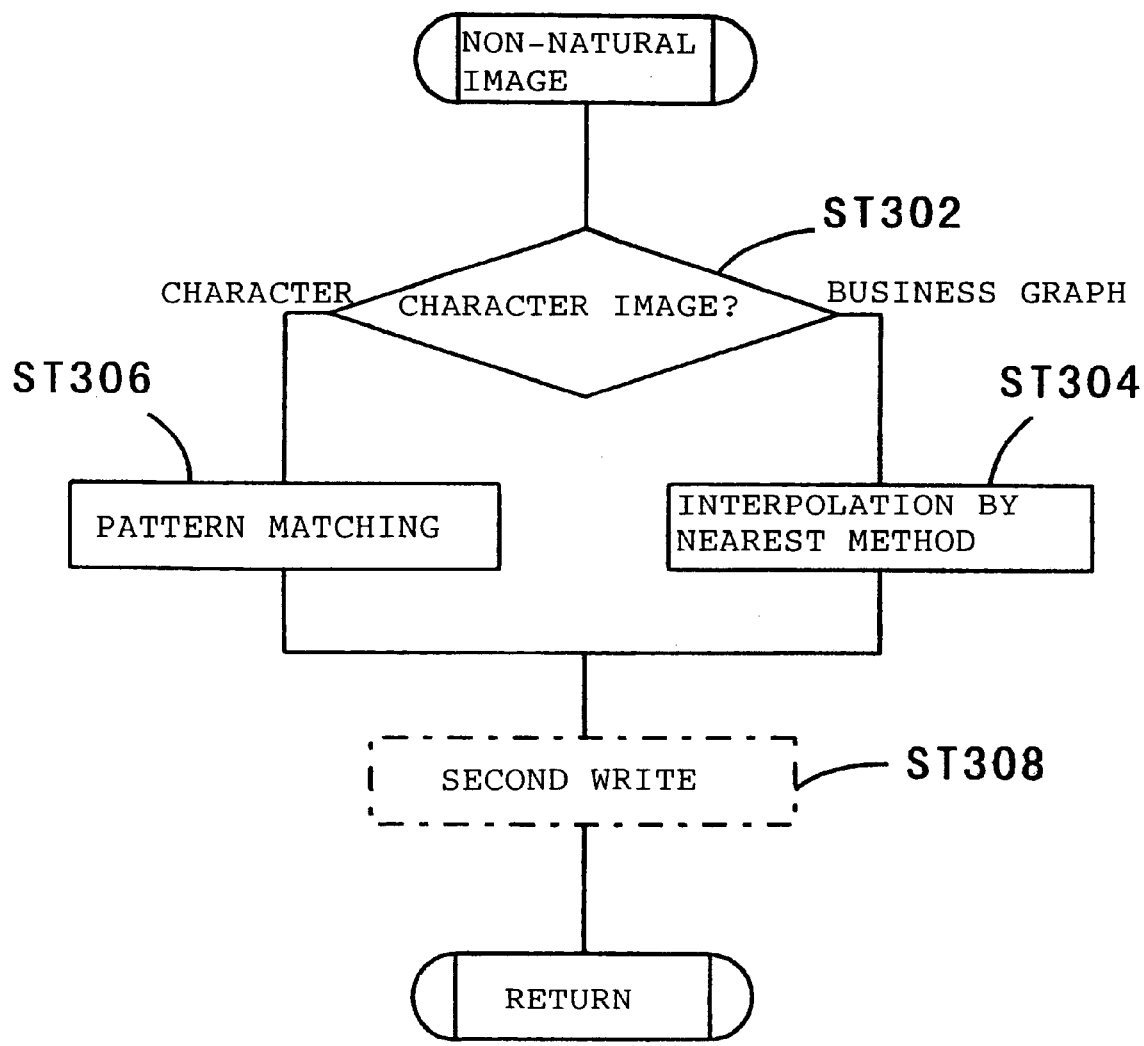
FIG. 20 is a flowchart showing the interpolation process for a non-natural image in the image data interpolating apparatus of the invention.
Figure 22A:
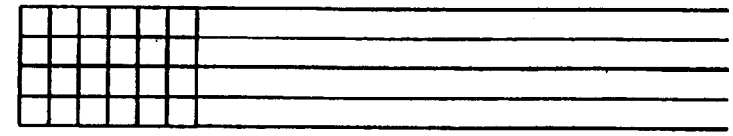
FIGS. 22A and 22B show a case where image data is read out into a buffer for every type.
Figure 22B:
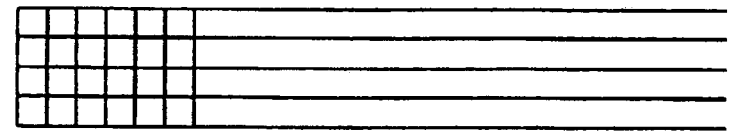

On the premise that the aforesaid interpolating process is executable, the image data is divided into a type belonging to a natural image and a type belonging to a non-natural image. The processing as shown in FIG. 19 is carried out for the former, whereas the processing as shown in FIG. 20 is carried out for the latter. FIGS. 21A and 21B show a case where image data is read out by one line for every type of image. The pixels are sorted out for every type of a natural image, character and business graph while it is determined whether each pixel on the color information virtual drawing screen is a natural image, character or business graph on the basis of attribute information virtual drawing screen. Pixel information previously initialized as background pixels is applied when sorted only the arrangement of pixels in the horizontal direction is insufficient for execution of the interpolating process, and information of pixels in the vertical direction is also required. Accordingly, four lines of pixels are actually read out to be stored in a work area, so that the interpolating process is carried out. Employment of four lines in the embodiment is based on the fact that sixteen pixels (4×4 pixels) are treated as a processing unit in the cubic method and the pattern matching. The number of lines may be increased or reduced as the need arises.

A margin extending process is carried out for the natural image at step ST202. A margin is previously extended at the peripheral edge of a pixel in the margin extending process. FIG. 23 shows the necessity of the process.

Figure 23A:
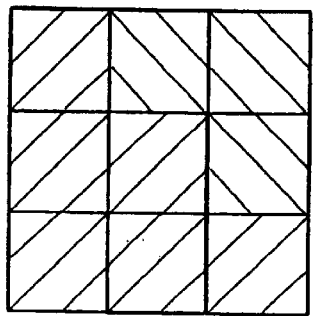
FIGS. 23A to 23E show an inadequacy in a case where mixed image data are separated for the interpolation process.
Figure 23B:
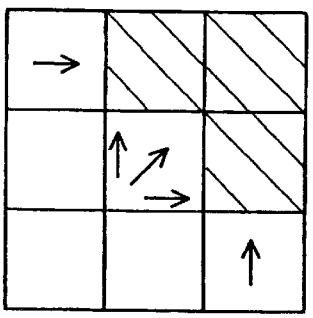

First, a region of natural image and a region of non-natural image are mixed so as to be adjacent to each other as shown in FIG. 23A. However, when the image data is divided for every type, a blank region is produced as shown in FIG. 23B. At this time, the blank is processed merely as a background color.

On the other hand, the cubic method utilizes the cubic function so that the interpolation pixel is smoothly changed. Accordingly, information about pixels outside a region to be interpolated is used in that region. Concerning the square region of sixteen pixels, when pixels are interpolated in the inside square region of four pixels, information about outside twelve pixels is utilized. In short, outside information is brought in at the time of interpolation.

Figure 23C:
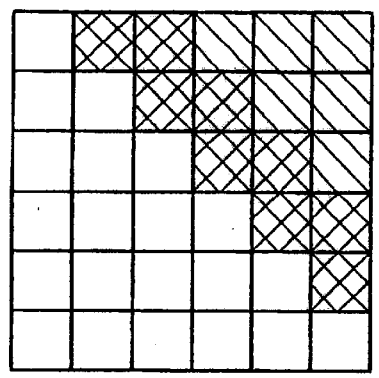
Figure 23D:
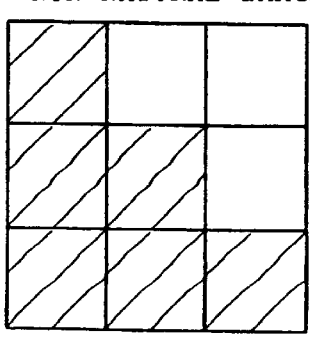
Figure 23E:
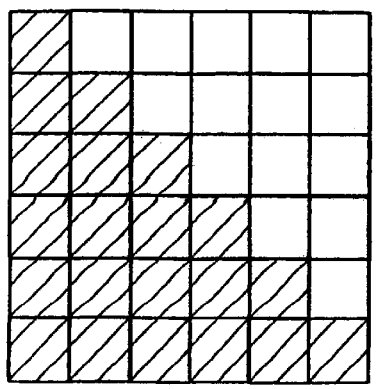

This results in no problem inside a natural image. However, the background pixels are generated in a marginal portion adjacent to the background pixels. Accordingly, information about nothing or information about white or black is utilized in the interpolating computation. FIG. 23C shows that information about background pixel generated in the margin of the region of natural image is brought into the adjacent pixel, so that the interpolating computation influenced by the brought information is carried out for the marginal pixels of interpolated ones. Since the aforesaid other method does not bring in the outside information, the influence upon the margin need not be considered as shown in FIGS. 23D and 23E.

FIGS. 24A to 24D show a countermeasure in the case where the outside information is brought in. In FIG. 24A, three (A to C) of nine pixels contain pixel information and the other six pixels constitute background pixels. One Pixel adjacent to the margin is copied outside the margin such that the margin is extended, as shown in FIG. 24B. Information about outside background pixels is not brought in when interpolation pixels are generated in original regions after the marginal extension (FIG. 24C). This example supposes the case of the cubic method, and the margin is extended outward by one pixel. However, the margin may be extended by the number of pixels necessary in the interpolating process.

The process for extending the margin has two sides. One side is directed to not bringing in the information about background pixels adjacent to the margin in the interpolating process bringing in the pixel information from the outside region. The other side is directed to expanding the margin. FIG. 24D shows an example in which after extension of the margin, the interpolating process is carried out for the pixels including extended ones. When the margin is extended, the pixels are generated in a portion which should originally be left as background pixels. This results in invasion into an adjacent image region such that an area ratio between adjacent image regions changes. However, the problem of the area ratio can be solved by overwriting the result of interpolating process carried out for the other image region.

A true purpose for extending the margin is to make a foundation. Referring to FIGS. 23A to 23E, for example, the natural image and the non-natural image are adjacent to each other when they are co-existent and accordingly, no gaps are produced. However, the interpolating process may change a marginal contour. This change may result from a problem in the computation or an influence of the pattern matching. Since the image data is smoothed according to an interpolating scale factor particularly in the pattern matching as shown in FIG. 25, matching of an image region before interpolation with an adjacent image region is not taken into consideration. Accordingly, there is a case where the margin of an interpolation pixel prepared by the pattern matching does not correspond with the margin of an interpolation pixel obtained by another interpolating process. In this case, a background pixel resulting in a gap is generated. When a background pixel is generated where no background pixel is existent, only that pixel becomes white. In such a case, the region of one image is previously enlarged. Even in a case where a background pixel is generated in the margin when the interpolating process has been carried out for the other image, the background pixel is prevented from appearing as a gap since pixels of the adjacent image region are generated in the foundation.

The margin extending process is carried out in the former sense at step ST202, and the interpolating process by the cubic method is carried out at step ST204. Thus, the pixels of the natural image are distinguished and read out and the interpolating process suitable for the natural image can be carried out.

On the other hand, the non-natural image is divided into a character image and a business graph at step ST302. The interpolating process by the pattern matching is carried out for the character image at step ST306, and the interpolating process by the nearest method is carried out for the business graph at step ST304. The pattern matching is carried out for the character image so that an attractive margin contour is obtained. Regarding the business graph and computer graphics, since an original margin contour is preserved, a suitable interpolating process can be carried out. In the business graph and computer graphics, there is a case where maintaining the original margin contour is preferable, whereas there is another case where a smoothed margin is preferred. Accordingly, the correspondence between the image data type and the interpolating process may be selectable.

The natural image is firstly written at step ST206 after completion of the interpolating process, and the non-natural image is secondly written at step ST308 after completion of the interpolating process. The steps ST206 and ST308 are shown by chain line in the flowcharts of FIGS. 19 and 20 respectively. These processes actually correspond to an interpolated image superposing process at step ST108 in the flowchart of FIG. 4.

The pixels of the natural image and the pixels of the non-natural image are divided and interpolated in the discrete work areas. When the natural and non-natural images are combined, the natural image is firstly written and the non-natural image is secondly written. In this case, the firstly written pixels remain when the firstly and secondly written pixels are not superposed. The secondly written pixels remain when the firstly and secondly written pixels are superposed.

The above-described writing order is one mode of the superposing process. In this example, the interpolating process by the pattern matching is carried out for the secondly written pixels. The pattern matching puts emphasis on smoothing the margin as shown in FIG. 25. Accordingly, a benefit of the pattern matching can effectively be obtained even when the marginal contour is not smoothed in the firstly written pixels. Further, the margin extending process is carried out in the firstly written pixels so that the margin is extended. The interpolating process is carried out for the secondly written pixels without marginal extension. In this case, when the superposition of the pixels is carried out, the foundation can effectively be prevented from being exposed. Thus, when the superposition at the marginal portion is considered according to the nature of the interpolating process, the foundation can be prevented from being exposed or the marginal contour can be rendered fine. These processes constitute a margin processing unit and a superposing unit (synthesizing unit) respectively.

A control manner for the above-described writing order is varied on an actual program. Accordingly, only the writing order needs to be maintained in any way and steps ST206 and ST308 are shown by chain line in this sense.

When the interpolated pixels are superposed, a color correction is carried out for conversion of color coordinates from RGB to CMYK at step ST110. A half tone process is carried out at step ST112 since the color printer 17b has two gradations. Print data is output to the color printer 17b at step ST114.

The foregoing description relates to the printer driver 12c and can also be applied to the display driver 12b.

When a plurality of types of image data are superposed and written onto the color information virtual drawing screen, attribute information of each pixel is written on the attribute information virtual drawing screen so that the image data are distinguished for every type and read out. When the result of superposition is read out from the virtual drawing screen and the interpolating process is carried out, the image data is read out for every type thereof on the basis of the attribute information, so that the interpolating process suitable for each type is carried out. Further, since the margin of the image data is affected by the interpolating process, the superposition carried out after the interpolating process is controlled so that a most suitable margin is obtained. Consequently, an optimum result of interpolation can be achieved even when the image data are co-existent.

In the foregoing embodiment, the types of image data include the natural image and non-natural image. However, the image data may include metacommand and non-metacommand and processing for them can be accomplished.

Figure 26:
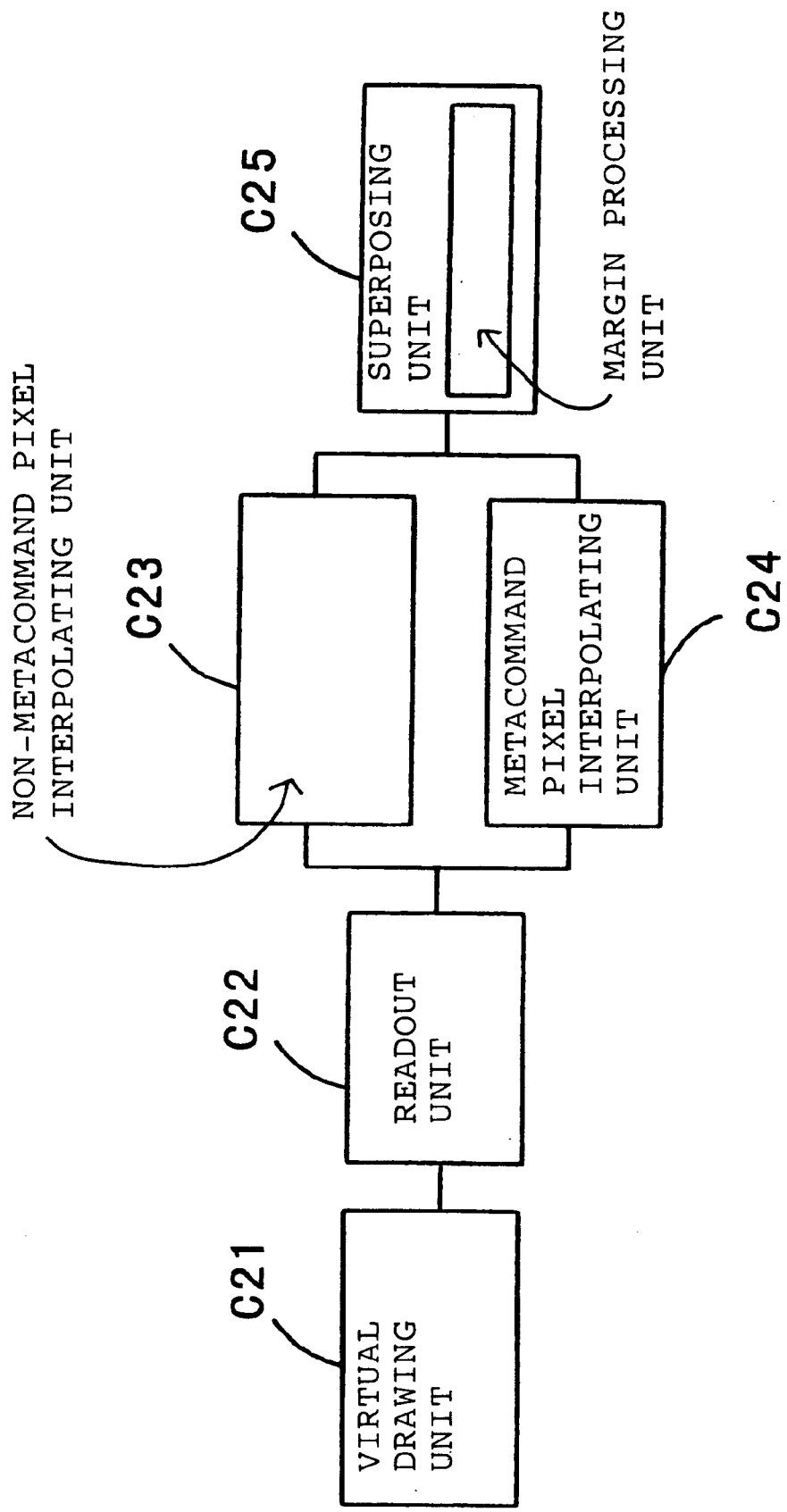
FIG. 26 is a block diagram showing the image data interpolating apparatus of another embodiment in accordance with the invention.

FIG. 26 is a block diagram showing the image data interpolating apparatus of another embodiment in accordance with the invention.

In this embodiment, in view of the difference in the natures of the images, the virtual drawing unit C21 inputs image data corresponding to metacommand and another image data and superposes the image data in a predetermined order so that both image data are distinguishable from each other, drawing on the virtual region. The readout unit C22 reads out the image data and a non-metacommand pixel interpolating unit C23 carries out an interpolating process so that the pixel corresponding to the image data other than the metacommand in the virtual region takes a predetermined interpolating scale factor. At this time, the peripheral region is extended and the interpolating process is carried out. Accordingly, an interpolated image having a larger region than the original is obtained. On the other hand, a metacommand pixel interpolating unit C24 also carries out an interpolating process so that the pixel corresponding to the image data other than the metacommand in the virtual region takes a predetermined interpolating scale factor. However, the metacommand pixel interpolating unit C24 generates an interpolated pixel corresponding to the original metacommand. A superposing unit C25 synthesizes the result of interpolation by the non-metacommand interpolating unit C23 and the result of interpolation by the metacommand interpolating unit C24. Regarding an overlapped portion, the result of interpolation by the metacommand pixel interpolating unit C24 has priority to the result of interpolation by the non-metacommand pixel interpolating unit C23.

In the embodiment, the display driver 12b and the printer driver 12c constitute the virtual drawing unit C21, readout unit C22, non-metacommand pixel interpolating unit C23, metacommand pixel interpolating unit C24 and superposing unit C25.

Figure 27:
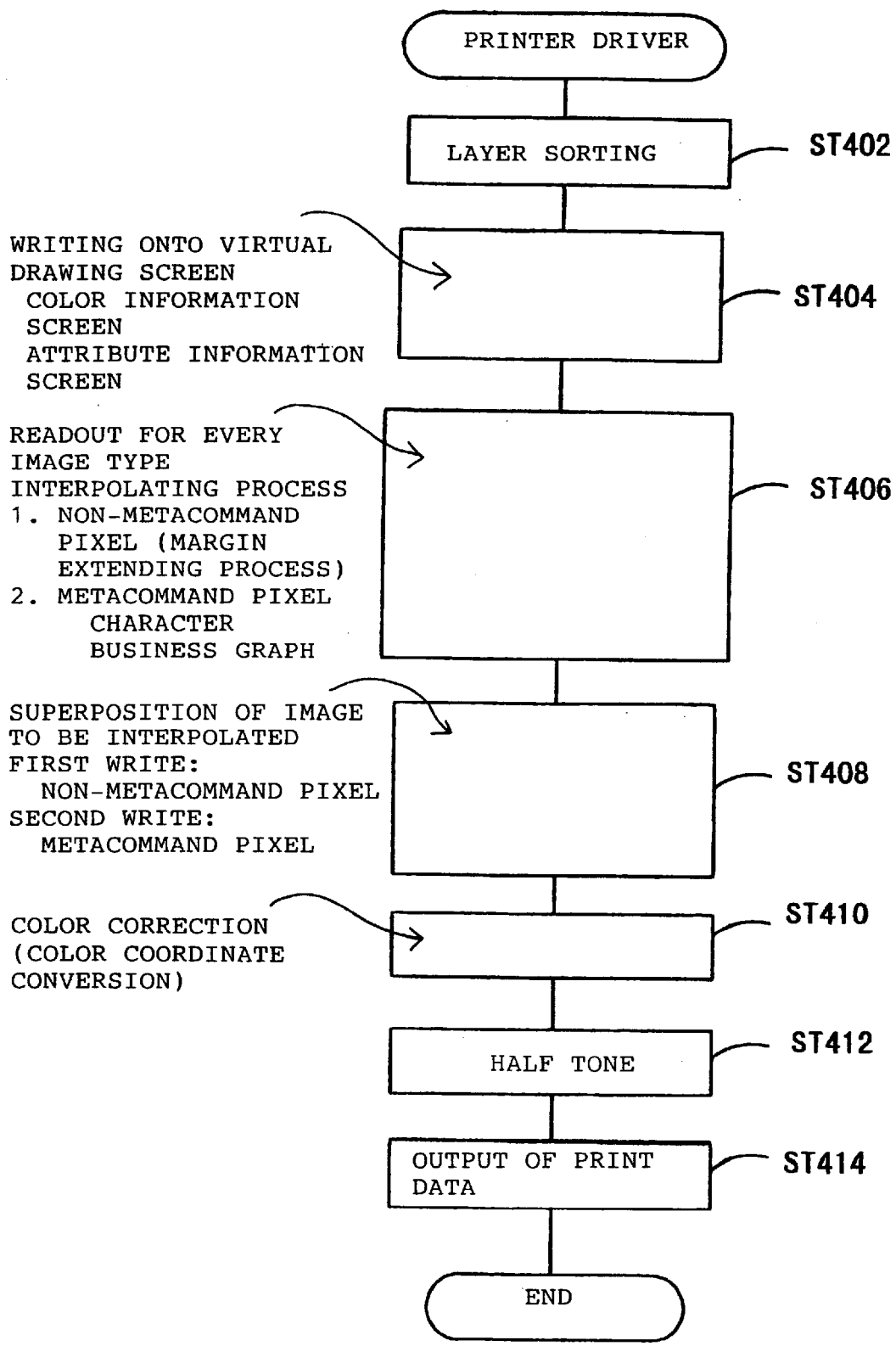
FIG. 27 is a flowchart of main processing of the image data interpolating apparatus of the invention.
Figure 28:
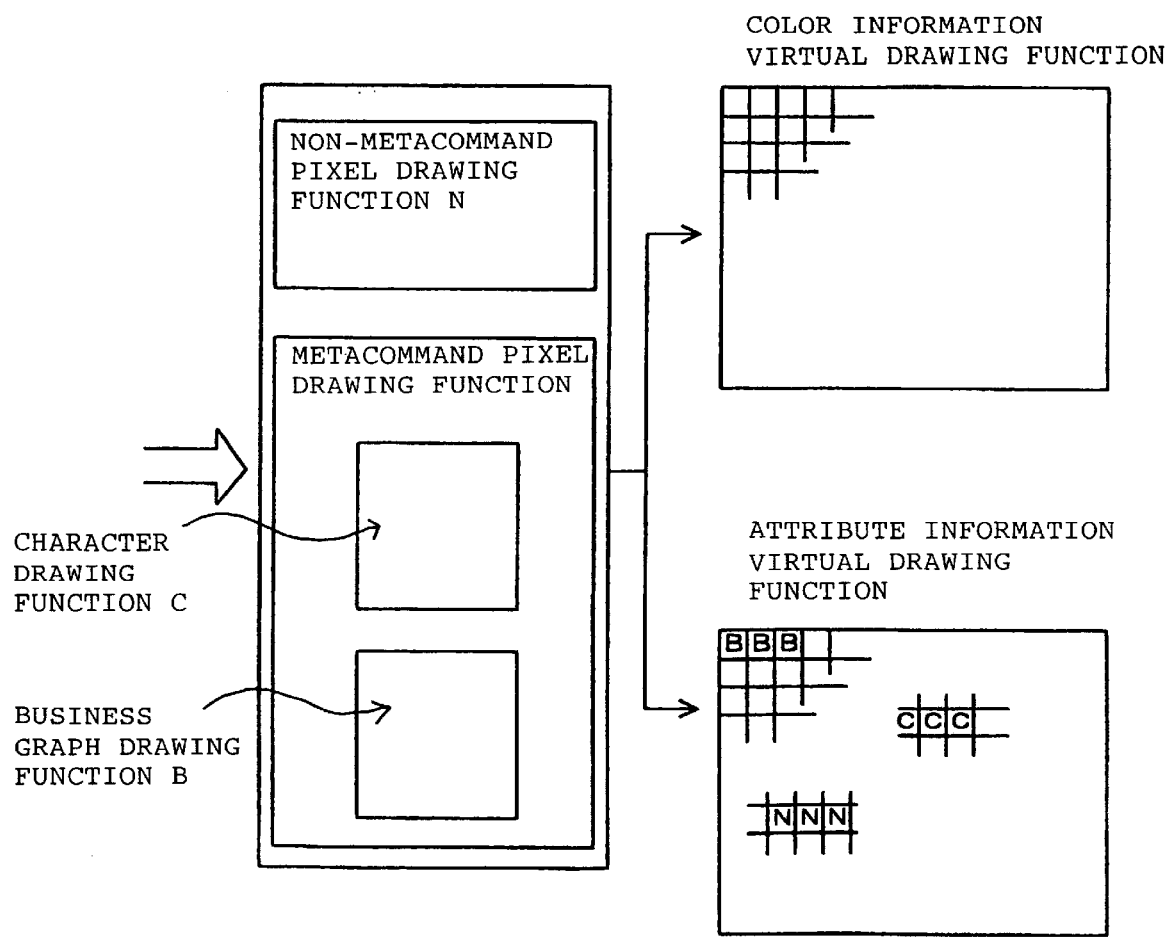
FIG. 28 shows writing onto a virtual drawing screen.

FIG. 27 is a flowchart showing the resolution conversion carried out by the printer driver 12c. The image data is input and sorted according to the superposition at step ST402. The rearranged image data is written onto the virtual drawing screen serving as the virtual region at step ST404. FIG. 28 typically shows writing onto the virtual drawing screen. The attribute information virtual drawing screen is used so that each pixel is determined to be a non-metacommand pixel (N), or a character (C) or a business graph (B) of the metacommand pixel. One byte is allocated for every pixel so that an attribute identification code (N, C or B) is written. More specifically, bit-map image data is processed as the non-metacommand pixel. The bit-map image data includes computer graphics as well as photograph. The bit-map image data may be divided into them and the interpolating process may be changed according to them, or a predetermined interpolating process may be applied uniformly. Whether the image data is the photograph or computer graphics can be determined by analyzing the image data. As one example, the image data may be determined to be a natural image when the number of used colors is large, whereas the image data may be determined to be a non-natural image when the number of used colors is small. In the case of a natural image, even when objects have the same color, they are determined to have a plurality of colors due to shading. The relationship between the color information virtual drawing screen and the attribute information virtual drawing screen is the same as shown in FIGS. 6A and 6B.

At step ST406, the image data is read out from the virtual drawing screen as shown in FIG. 28 for every type of image and an optimum interpolating process according to the image type is carried out.

As an interpolating process suitable for a natural image such as photograph, which is an example of non-metacommand pixel, the interpolating process by a cubic method is executed. As an interpolating process suitable for a non-natural image such as computer graphics, which is another example of the non-metacommand pixels, the interpolating process by a nearest method is executed. On the other hand, the interpolating process by the pattern matching is carried out for the metacommand pixel.

Pixels to be written are specified regarding the non-metacommand image when the drawing function according to the image data is called and data is written on the color information virtual drawing screen and the attribute information virtual drawing screen for every pixel. Regarding the metacommand pixel, the drawing function obtains pixels to be written by computation. For the reason of these natures, parameters of the command are changed at the application 12d side so that a figure with any size can be drawn. However, when a plurality of commands correspond to one figure as in a character, a pixel serving as noise is sometimes generated. More specifically, a dot is not produced at one scale factor while a useless dot is produced at another scale factor. The dot tends to be produced particularly at a joint of lines drawn with a plurality of commands. It is preferable that no such dot as noise is produced.

FIGS. 29A to 29D show a manner of eliminating noise dot employed in the embodiment. Suppose that an image shown in FIG. 29A is original. The image shows a part of a character and is found to be a corner of a frame-shaped figure. Further, the image is supposed to be a joint of a plurality of drawing commands. However, the image is not necessarily a joint.

Note a dot surrounded by two-dot chain line. This dot is not considered to be particularly necessary. The other part is considered to show a line with 2-dot width. It is difficult to suppose the necessity that a projecting dot is affixed at the corner. In other words, it is proper to determine that the dot should not be affixed as shown in FIG. 29B. This determination cannot absolutely be made when the region becomes smaller. However, when sixteen pixels are compared with the pattern data as in the embodiment, such determination can be made.

On the premise as described above, regarding the pattern data containing the dot as shown in FIG. 29C, interpolating pixel information is caused to correspond to the image data. When the pixel as noise produced when the metacommand pixel is translated and drawn is processed through the pattern matching, the same effect is achieved as if the noise pixel is found and deleted in a conversion process and an interpolating pixel is generated so as to correspond to the original metacommand pixel.

It is obvious that the above-described dot deleting manner can be applied generally to the metacommand. Accordingly, when a dot considered to be noise is generated in the square range of sixteen pixels, interpolating pixel information in which the dot has been deleted is caused to correspond to the pattern data. However, the character has a special characteristic that a large number of drawing commands are applied to a small region, and accordingly, a noise dot tends to be easily generated. As a result, the noise can easily be specified.

Figure 30:
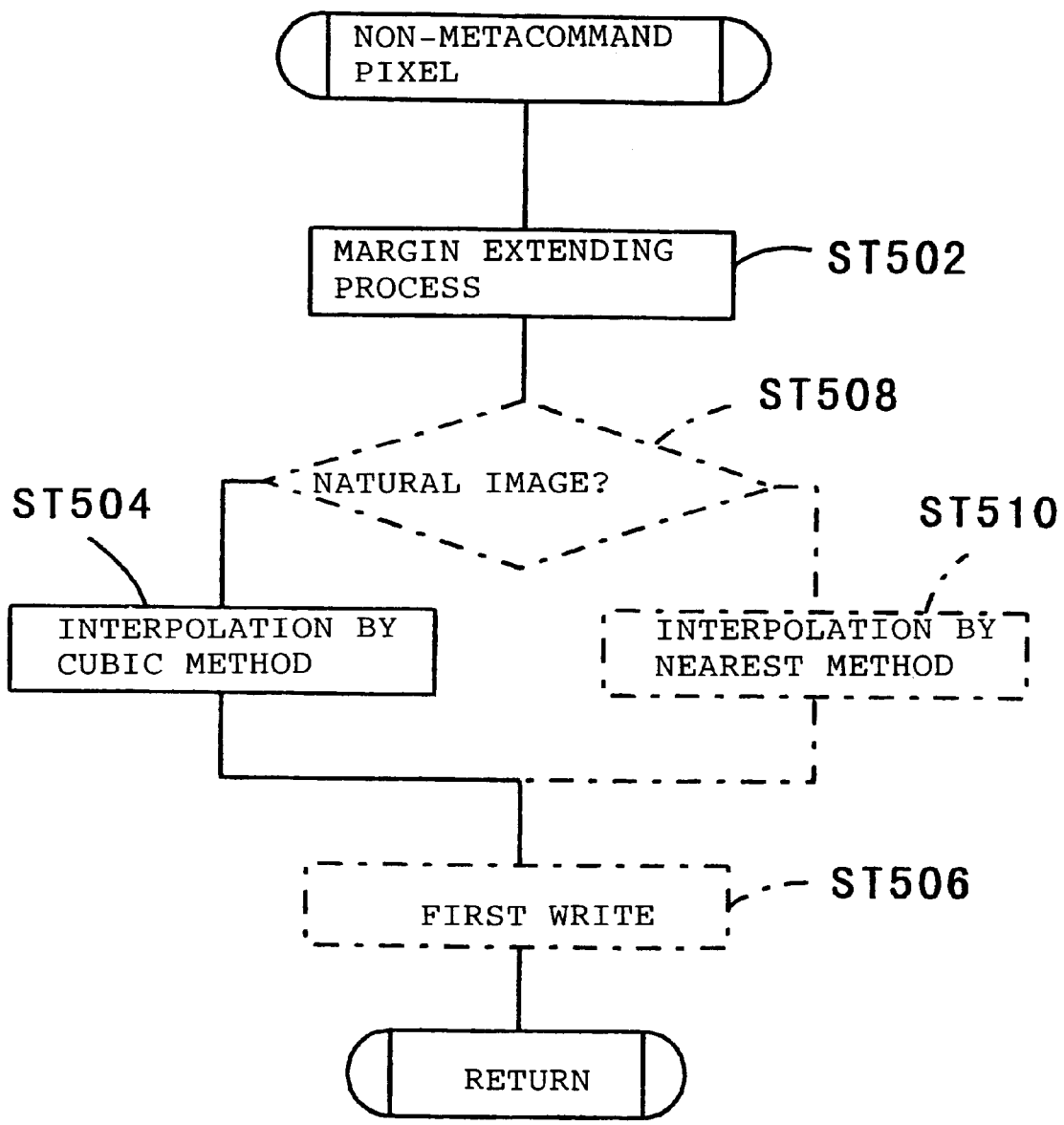
FIG. 30 is a flowchart showing the interpolation process for non-metacommand pixels in the image data interpolating apparatus of the invention.
Figure 31:
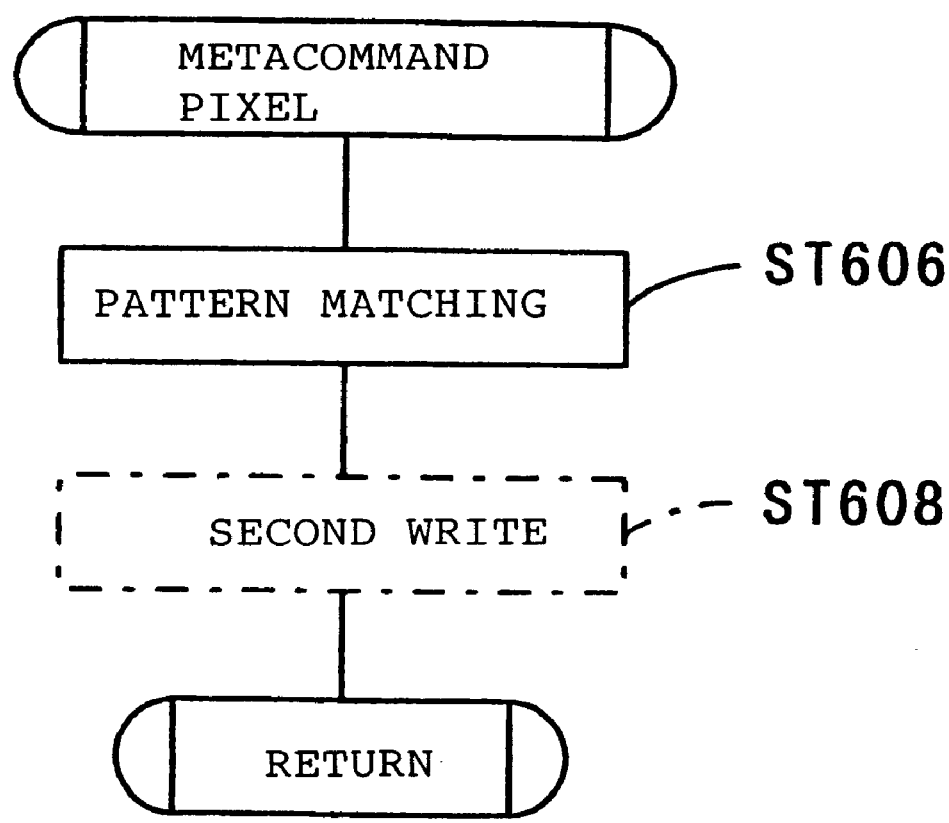
FIG. 31 is flowchart showing the interpolation process for metacommand pixels in the image data interpolating apparatus of the invention.

On the premise that the above-described interpolating process is executable, the image is read out for every type and the interpolating process is carried out at step ST406. The image is roughly divided into a non-metacommand pixel and a metacommand pixel. The interpolating process by the cubic method or the nearest method is carried out for the former as shown in FIG. 30. The interpolating process by the pattern matching is carried out for the latter as shown in FIG. 31. FIGS. 32A and 32B show a case where image data is read out by one line for every type of image. The pixels are sorted out while it is determined whether each pixel on the color information virtual drawing screen is a non-metacommand pixel (N) or a metacommand pixel (C or B) on the basis of attribute information virtual drawing screen. Pixel information previously initialized as background pixels is applied when sorted.

Only the horizontal arrangement of the pixels is insufficient for execution of the interpolating process, and information about pixels in the vertical direction is also necessary. Accordingly, four lines of pixels are actually read out to be stored on the work area and the interpolating process is then carried out as shown in FIGS. 33A and 33B. Four lines are read out since square sixteen pixels (4×4) are a processing unit in the cubic method or the pattern matching. The number of lines may be increased or decreased as occasion demands.

In the interpolating process by the above-described pattern matching, a dot affixed as a metacommand pixel is sometimes deleted. Since this dot is a noise dot, the metacommand pixel recovers its original contour by deletion of the dot. However, a process for compensating the dot to be deleted by another pixel. Accordingly, in a case where a dot is deleted when different types of pixels are adjacent to each other, a gap may be produced between the pixels.

In such a case, a region is previously expanded with respect to the adjacent pixels. Even in a case where a background pixel is generated in the margin when the interpolating process is carried out for the other image, the gap is prevented from being exposed since a pixel in the adjacent image region is generated in the foundation. Accordingly, a margin extending process is carried out for the non-metacommand pixel at step ST502. In the margin extending process, the margin of the pixel is previously extended in the peripheral edge thereof. In FIGS. 32A to 32C, when the non-metacommand pixel is read out, one pixel is copied outside a pixel adjacent to the background pixel, whereby the margin extending process is carried out.

FIGS. 34A to 34D show a countermeasure in the interpolating process carried out after the above-described margin extension. In FIG. 34A, three (A to C) of nine pixels contain pixel information and the other six pixels are background pixels. One pixel adjacent to the margin is copied outside the margin, so that the margin is extended, as shown in FIG. 34B. When the margin is not extended, the result of the interpolating process is shown in FIG. 34C. When the interpolating process is carried out after the margin extension, the original margin is outwardly spread as shown in FIG. 34D. Consequently, the foundation is formed for the adjacent pixel. Although the margin is extended outward by one pixel in the example, the margin may be extended by the number of pixels according to the number of dots to be deleted by the pattern matching with respect to the adjacent metacommand pixels.

At step ST502, the margin extending process is carried out in the above-described sense. The interpolating process by the cubic method is carried out at step ST504, that is, metacommand pixels are read out and the interpolating process most suitable for the natural image is carried out.

In FIG. 30, chain line denotes a determining process as to whether the image is a natural image and the interpolating process by the nearest method. As described above, the embodiment shows that a bit-map image is determined to be a metacommand pixel but the image may further be determined whether it is a natural image. Accordingly, the image is written on the virtual region so that types of metacommand pixels are recognizable. At step ST508, the determination is made as to whether the image is a natural image. When the image is a natural image, the interpolating process by the cubic method is carried out at step ST504 as described above. When the image is not a natural image, the interpolating process by the nearest method is carried out at step ST510.

Regarding metacommand pixels, the interpolating process by the pattern matching is carried out at step ST606. As a result, the dot as noise is deleted concerning the character such that a character with fine lines is obtained. Concerning the business graph, a smoothed image with no unnatural dot is obtained. Thus, a most suitable interpolating process can be carried out.

Regarding the metacommand pixels, dots sometimes lack in the interpolating process. As a countermeasure, a margin extending process is carried out for the adjacent non-metacommand pixel, and a metacommand pixel is overwritten. More specifically, the image is firstly written at step ST506 after the interpolating process concerning the non-metacommand pixel. Regarding the metacommand pixel, the image is secondly written at step ST608 after the interpolating process. Steps ST506 and ST608 in FIGS. 30 and 31 respectively are shown by chain line. These processes actually correspond to the interpolated pixel superposing process at step ST408 in FIG. 27.

Describing significance of the first writing step ST506 and the following writing step ST408, the non-metacommand pixel and the metacommand pixel are separated from each other and these pixels are interpolated in separate work areas. Thereafter, when the pixels are combined together, the non-metacommand pixel for which the margin has been extended is firstly written, and the metacommand pixel for which the interpolating process has been carried out in correspondence to the original metacommand pixel is secondly written. In this case, when the firstly written pixel and the second written pixel are not overlapped, the firstly written pixel is maintained. When the pixels are overlapped, the secondly written pixel is maintained. Accordingly, the foundation is not exposed even when the marginal contour of the secondly written pixel is changed at the margin where both pixels are adjacent to each other. Overwriting is unnecessary for background pixels. Pixels to be overwritten are those other than the background pixels.

The writing order is one mode of a preferential process in the superposing process. A control manner for the writing order in the preferential process is varied on an actual program. Accordingly, the preferential process can only be substantially maintained. The same process may be realized by another technique.

When the interpolated pixels are superposed, a color correction is carried out for conversion of color coordinates from RGB to CMYK at step ST410. A half tone process is carried out at step ST412 since the color printer 17*b* has two gradations.

Print data is output to the color printer 17*b* at step ST414.

The foregoing description relates to the printer driver 12*c* and can also be applied to the display driver 12*b*.

The interpolating process is carried out in consideration of the original metacommand with respect to the pixel generated in correspondence to the metacommand, so that the processed image itself can be improved. However, the marginal region does not correspond with the adjacent pixel. In order that this unanaturalness may be solved, the margin is extended concerning the non-metacommand pixel and the interpolating process is then carried out. Further, the metacommand pixel has preference in the portion where the metacommand and non-metacommand pixels are superposed. Almost all the extended margin becomes the foundation of the adjacent region to thereby be concealed. However, generation of the background pixel can be prevented when the marginal contour is changed.

INDUSTRIAL APPLICABILITY OF THE INVENTION

According to the invention of claim 1, an interpolating process corresponding to every type of image data is carried out. Consequently, the image data interpolating apparatus can provide a fine interpolated image even when different type of image data are co-existent.

According to the invention of claim 2, writing onto the virtual region can be accomplished easily.

According to the invention of claim 3, adjustment is performed according to the characteristic of the interpolating process in the superposition since the processing near the margin tends to differ depending upon the interpolating process. Consequently, a fine marginal configuration can be obtained.

According to the invention of claim 4, the foundation for the marginal portion can be generated since the margin is extended. Consequently, influences due to lack of pixels in the adjacent image data can be eliminated.

According to the invention of claim 5, when information outside the margin is drawn in, a pixel about which information is absent. This results in the same influences as those due to lack of pixels. The influences can be prevented by previous extension.

According to the invention of claim 6, no gap is produced near the marginal portion even when such a processing as to positively smooth the marginal configuration in the image interpolating process for the metacommand. Consequently, desired results of interpolation can be achieved.

According to the invention of claim 7, a processing for expanding the peripheral region can easily be performed.

According to the invention of claim 8, the processing can be simplified since the adjustment is performed by the sequence.

According to the invention of each of claims 9 to 16, the image data interpolating method achieving the same effects as described above can be provided.

According to the invention of each of claims 17 to 24, the medium on which the image data interpolating program achieving the same effects as those described above is recorded can be provided.

We claim:

1. An image data interpolating apparatus which obtains image data containing attribute information capable of distinguishing a type of image for every pixel and enlarges the image data by an interpolating process, the device comprising:
    a readout unit which reads out the image data;
    an interpolating unit which distinguishes a plurality of image types of the pixels based on the attribute information and applies one of a plurality of interpolating processes differing for every one of the image types to each of the pixels; and
    a synthesizing unit which synthesizes the pixels interpolated by the different interpolating processes.

2. The image data interpolating apparatus according to claim 1, further comprising a virtual drawing unit which inputs the plurality of types of image data having different image types to superpose the image data in a predetermined order and renders the image types distinguishable, thereby performing a drawing operation in a virtual region, wherein the readout unit reads out the image data from the virtual region.

3. The image data interpolating apparatus according to claim 1 or 2, wherein the synthesizing unit includes a margin processing unit which adjusts superposition of margins of the image data after interpolation of the pixels.

4. The image data interpolating apparatus according to claim 3, wherein when the readout unit reads out the image data, the margin processing unit causes the readout unit to read out the image data with a margin enlarged, thereby superposing the image data on the image data interpolated by the interpolating unit on the basis of the image data with the enlarged margin.

5. The image data interpolating apparatus according to claim 4, wherein the margin processing unit enlarges the margin of the image data with respect to an interpolating process in which information outside the margin is drawn in.

6. The image data interpolating apparatus according to claim 1, wherein said plurality of types of image data having different image types include image data corresponding to a metacommand and other image data, which further comprises:
    a non-metacommand pixel interpolating unit which enlarges a marginal region when the pixel corresponding to the image data other than the metacommand and performing an interpolating process so that a predetermined interpolation scale factor is obtained; and
    a metacommand pixel interpolating unit which generates an interpolated pixel so that the interpolated pixel corresponds to the original metacommand when reading out the pixel corresponding to the metacommand and performing an interpolating process so that the interpolating scale factor is obtained,
    wherein the synthesizing unit synthesizes a result of interpolation by the non-metacommand pixel interpolating unit and a result of interpolation by the metacommand pixel interpolating unit, the synthesizing unit preferring the result of interpolation by the metacommand pixel interpolating unit with respect to the superposed portion.

7. The image data interpolating apparatus according to claim 6, wherein the non-metacommand pixel interpolating unit uses information about the pixel in the marginal region as information about a pixel outside the marginal region.

8. The image data interpolating apparatus according to claim 1, wherein the synthesizing unit synthesizes the pixels, superposing pixels in the result of interpolation by the metacommand pixel interpolating unit other than background pixels on the result of interpolation by the non-metacommand pixel interpolating unit.

9. An image data interpolating method which obtains image data containing attribute information capable of distinguishing a type of image in the unit of pixel and enlarges the image data by an interpolating process, the method comprising the steps of:
    reading out the image data; and
    distinguishing a plurality of image types of the pixels based on the attribute information, applying one of a plurality of interpolating processes differing for every one of the image types to each one of the pixels, and synthesizing the pixels interpolated by the different interpolating processes.

10. The image data interpolating method according to claim 9, wherein the plurality of types of image data having different image types are input and superposed in a predetermined order in a virtual region with the image types being rendered distinguishable, thereby drawing in a virtual region, and the image data is read out from the virtual region.

11. The image data interpolating method according to claim 9 or 10, wherein superposition of margins of the image data after interpolation of the pixels is adjusted.

12. The image data interpolating method according to claim 11, wherein when the image data is read out, the image data with a margin enlarged is read out and the image data is superposed on the image data interpolated by the interpolating means on the basis of the image data with the enlarged margin.

13. The image data interpolating method according to claim 12, wherein the margin of the image data is enlarged with respect to an interpolating process in which information outside the margin is drawn in.

14. The image data interpolating method according to claim 9, wherein said plurality of types of image data having different image types include image data corresponding to a metacommand and other image data,
   wherein a marginal region is enlarged when the pixel corresponding to the image data other than the metacommand and an interpolating process is performed so that a predetermined interpolation scale factor is obtained,
   wherein an interpolated pixel is generated so that the interpolated pixel corresponds to the original metacommand when the pixel corresponding to the metacommand is read out and an interpolating process is performed so that the interpolating scale factor is obtained, and
   wherein a result of interpolation by the non-metacommand pixel interpolating means and a result of interpolation by the metacommand pixel interpolating means are synthesized, the result of interpolation by the metacommand pixel interpolating means being preferred with respect to the superposed portion.

15. The image data interpolating method according to claim 14, wherein information about the pixel in the marginal region is used as information about a pixel outside the marginal region.

16. The image data interpolating method according to claim 9, wherein the pixels are synthesized with the result of interpolation by the metacommand pixel interpolating unit other than background being superposed on the pixels in the result of interpolation by the non-metacommand pixel interpolating unit.

17. A medium on which an image data interpolating program is recorded, the program accomplishing the function of obtaining image data containing attribute information capable of distinguishing a type of image in the unit of pixel and enlarging the image data by an interpolating process, the program accomplishing on a computer the steps of:
   reading out image data; and
   distinguishing a plurality of image types of the pixels based on the attribute information, applying one of a plurality of interpolating processes differing for every one of the image types to each of the pixels, and synthesizing the pixels interpolated by the different interpolating processes.

18. The medium according to claim 17, wherein the plurality of types of image data having different image types are input and superposed in a predetermined order in a virtual region with the image types being rendered distinguishable, thereby drawing in a virtual region, and the image data is read out from the virtual region.

19. The medium according to claim 17 or 18, wherein superposition of margins of the image data after interpolation of the pixels is adjusted.

20. The medium according to claim 19, wherein when the image data is read out, the image data with a margin enlarged is read out and the image data is superposed on the image data interpolated by the interpolating unit on the basis of the image data with the enlarged margin.

21. The medium according to claim 20, wherein the margin of the image data is enlarged with respect to an interpolating process in which information outside the margin is drawn in.

22. The medium according to claim 17, wherein said plurality of types of image data having different image types include image data corresponding to a metacommand and other image data,
   wherein a marginal region is enlarged when the pixel corresponding to the image data other than the metacommand and an interpolating process is performed so that a predetermined interpolation scale factor is obtained,
   wherein an interpolated pixel is generated so that the interpolated pixel corresponds to the original metacommand when the pixel corresponding to the metacommmand is read out and an interpolating process is performed so that the interpolating scale factor is obtained, and
   wherein a result of interpolation by the non-metacommand pixel interpolating unit and a result of interpolation by the metacommand picture element interpolating unit are synthesized, the result of interpolation by the metacommand pixel interpolating unit being preferred with respect to the superposed portion.

23. The medium according to claim 22, wherein information about the pixel in the marginal region is used as information about a pixel outside the marginal region.

24. The medium according to claim 17, wherein the pixels are synthesized with the result of interpolation by the metacommand pixel interpolating unit other than background being superposed on the pixels in the result of interpolation by the non-metacommand pixel interpolating unit.

* * * * *